(12) United States Patent
Kasower

(10) Patent No.: US 8,781,953 B2
(45) Date of Patent: Jul. 15, 2014

(54) CARD MANAGEMENT SYSTEM AND METHOD

(75) Inventor: Sheldon Kasower, Bell Canyon, CA (US)

(73) Assignee: Consumerinfo.com, Inc., Costa Mesa, CA (US)

(*) Notice: Subject to any disclaimer, the term of this patent is extended or adjusted under 35 U.S.C. 154(b) by 368 days.

(21) Appl. No.: 12/702,424

(22) Filed: Feb. 9, 2010

(65) Prior Publication Data

US 2010/0145840 A1 Jun. 10, 2010

Related U.S. Application Data

(63) Continuation of application No. 12/131,548, filed on Jun. 2, 2008, now Pat. No. 7,689,505, which is a continuation of application No. 10/393,699, filed on Mar. 21, 2003, now Pat. No. 7,451,113.

(51) Int. Cl.
*G06Q 40/00* (2012.01)

(52) U.S. Cl.
USPC .............................................. 705/38; 705/35

(58) Field of Classification Search
USPC ..................................................... 705/35, 38
See application file for complete search history.

(56) References Cited

U.S. PATENT DOCUMENTS

| | | |
|---|---|---|
| 4,346,442 A | 8/1982 | Musmanno |
| 5,148,365 A | 9/1992 | Dembo |
| 5,500,513 A | 3/1996 | Langhans et al. |
| 5,590,038 A | 12/1996 | Pitroda |
| 5,640,577 A | 6/1997 | Scharmer |
| 5,659,731 A | 8/1997 | Gustafson |
| 5,692,107 A | 11/1997 | Simoudis et al. |
| 5,754,939 A | 5/1998 | Herz et al. |
| 5,819,234 A | 10/1998 | Slavin et al. |
| 5,822,751 A | 10/1998 | Gray et al. |

(Continued)

FOREIGN PATENT DOCUMENTS

| | | |
|---|---|---|
| JP | 10-222559 | 8/1998 |
| JP | 10-261009 | 9/1998 |

(Continued)

OTHER PUBLICATIONS

Ettorre, Paul Kahn on Exceptional Marketing, Management Review, vol. 38(11), Nov. 1994, pp. 48-51.

(Continued)

*Primary Examiner* — Sara C Hamilton
(74) *Attorney, Agent, or Firm* — Knobbe, Martens, Olson & Bear, LLP

(57) ABSTRACT

A method of registering a credit card user's credit card information by a credit card management organization. A card user accesses the card management computer system in a computer network. The method provides a user interface whereby the user grants authorization to the card management organization to obtain the card user's credit report from a credit reporting bureau. The method further transmits a request for the user's credit report to a credit reporting bureau and automatically downloads the user's credit report when received. The method further parses the credit report to determine a card issuer for each card on the credit report using a database of card issuer aliases. The method then fully or partially automatically registers each card with the user's account in the card management association and then presents the opportunity to the user to review and edit each card.

9 Claims, 42 Drawing Sheets

(56) References Cited

U.S. PATENT DOCUMENTS

| | | |
|---|---|---|
| 5,825,884 A | 10/1998 | Zdepski et al. |
| 5,828,837 A | 10/1998 | Eikeland |
| 5,832,068 A | 11/1998 | Smith |
| 5,844,218 A | 12/1998 | Kawan et al. |
| 5,881,131 A | 3/1999 | Farris et al. |
| 5,903,830 A | 5/1999 | Joao et al. |
| 5,903,881 A | 5/1999 | Schrader et al. |
| 5,956,693 A | 9/1999 | Geerlings |
| 5,961,593 A | 10/1999 | Gabber et al. |
| 5,978,780 A | 11/1999 | Watson |
| 5,990,038 A | 11/1999 | Suga et al. |
| 5,999,596 A | 12/1999 | Walker et al. |
| 6,021,943 A | 2/2000 | Chastain |
| 6,038,551 A | 3/2000 | Barlow et al. |
| 6,064,990 A | 5/2000 | Goldsmith |
| 6,070,147 A | 5/2000 | Harms et al. |
| 6,073,106 A | 6/2000 | Rozen et al. |
| 6,073,140 A | 6/2000 | Morgan et al. |
| 6,128,602 A | 10/2000 | Northington et al. |
| 6,157,927 A | 12/2000 | Schaefer et al. |
| 6,233,566 B1 | 5/2001 | Levine et al. |
| 6,253,202 B1 | 6/2001 | Gilmour |
| 6,254,000 B1 | 7/2001 | Degen et al. |
| 6,311,169 B2 | 10/2001 | Duhon |
| 6,405,173 B1 | 6/2002 | Honarvar |
| 6,446,200 B1 | 9/2002 | Ball et al. |
| 6,457,012 B1 | 9/2002 | Jatkowski |
| 6,463,533 B1 | 10/2002 | Calamera et al. |
| 6,523,022 B1 | 2/2003 | Hobbs |
| 6,523,041 B1 | 2/2003 | Morgan et al. |
| 6,581,059 B1 | 6/2003 | Barrett et al. |
| 6,601,173 B1 | 7/2003 | Mohler |
| 6,734,886 B1 | 5/2004 | Hagan et al. |
| 6,748,426 B1 | 6/2004 | Shaffer et al. |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,804,346 B1 | 10/2004 | Mewhinney |
| 6,845,448 B1 | 1/2005 | Chaganti et al. |
| 6,910,624 B1 | 6/2005 | Natsuno |
| 6,934,714 B2 | 8/2005 | Meinig |
| 6,950,858 B2 | 9/2005 | Ogami |
| 6,954,757 B2 | 10/2005 | Zargham et al. |
| 6,968,319 B1 | 11/2005 | Remington et al. |
| 6,983,379 B1 | 1/2006 | Spalink et al. |
| 6,983,478 B1 | 1/2006 | Grauch et al. |
| 6,985,887 B1 | 1/2006 | Sunstein et al. |
| 6,988,085 B2 | 1/2006 | Hedy |
| 7,028,001 B1 | 4/2006 | Muthuswamy et al. |
| 7,028,052 B2 | 4/2006 | Chapman et al. |
| 7,035,855 B1 | 4/2006 | Kilger et al. |
| 7,047,251 B2 | 5/2006 | Reed et al. |
| 7,050,989 B1 | 5/2006 | Hurt et al. |
| 7,072,909 B2 | 7/2006 | Polk |
| 7,076,475 B2 | 7/2006 | Honarvar |
| 7,133,935 B2 | 11/2006 | Hedy |
| 7,184,974 B2 | 2/2007 | Shishido |
| 7,185,016 B1 | 2/2007 | Rasmussen |
| 7,200,602 B2 | 4/2007 | Jonas |
| 7,234,160 B2 | 6/2007 | Vogel et al. |
| 7,246,067 B2 | 7/2007 | Austin et al. |
| 7,249,048 B1 | 7/2007 | O'Flaherty |
| 7,272,591 B1 | 9/2007 | Ghazal et al. |
| 7,281,652 B2 | 10/2007 | Foss |
| 7,314,167 B1 | 1/2008 | Kiliccote |
| 7,330,835 B2 | 2/2008 | Deggendorf |
| 7,343,149 B2 | 3/2008 | Benco |
| 7,356,516 B2 | 4/2008 | Richey et al. |
| 7,370,044 B2 | 5/2008 | Mulhern et al. |
| 7,373,324 B1 | 5/2008 | Engin et al. |
| 7,386,511 B2 | 6/2008 | Buchanan et al. |
| 7,389,913 B2 | 6/2008 | Starrs |
| 7,403,942 B1 | 7/2008 | Bayliss |
| 7,433,864 B2 | 10/2008 | Malik |
| 7,451,095 B1 | 11/2008 | Bradley et al. |
| 7,458,508 B1 | 12/2008 | Shao |
| 7,460,857 B2 | 12/2008 | Roach, Jr. |
| 7,478,157 B2 | 1/2009 | Bohrer et al. |
| 7,509,117 B2 | 3/2009 | Yum |
| 7,512,221 B2 | 3/2009 | Toms |
| 7,529,698 B2 | 5/2009 | Joao |
| 7,533,179 B2 | 5/2009 | Tarquini et al. |
| 7,536,346 B2 | 5/2009 | Aliffi et al. |
| 7,542,993 B2 | 6/2009 | Satterfield |
| 7,548,886 B2 | 6/2009 | Kirkland et al. |
| 7,552,089 B2 | 6/2009 | Bruer et al. |
| 7,562,814 B1 | 7/2009 | Shao et al. |
| 7,575,157 B2 | 8/2009 | Barnhardt et al. |
| 7,581,112 B2 | 8/2009 | Brown et al. |
| 7,584,146 B1 | 9/2009 | Duhon |
| 7,587,366 B2 | 9/2009 | Grim, III et al. |
| 7,596,512 B1 | 9/2009 | Raines et al. |
| 7,596,716 B2 | 9/2009 | Frost et al. |
| 7,603,701 B2 | 10/2009 | Gaucas |
| 7,606,725 B2 | 10/2009 | Robertson et al. |
| 7,610,216 B1 | 10/2009 | May et al. |
| 7,620,596 B2 | 11/2009 | Knudson et al. |
| 7,647,274 B2 | 1/2010 | Peterson et al. |
| 7,653,600 B2 | 1/2010 | Gustin |
| 7,672,833 B2 | 3/2010 | Blume et al. |
| 7,672,924 B1 | 3/2010 | Scheurich et al. |
| 7,672,926 B2 | 3/2010 | Ghazal et al. |
| 7,686,214 B1 | 3/2010 | Shao et al. |
| 7,689,487 B1 | 3/2010 | Britto et al. |
| 7,690,032 B1 | 3/2010 | Peirce |
| 7,698,445 B2 | 4/2010 | Fitzpatrick et al. |
| 7,708,190 B2 | 5/2010 | Brandt et al. |
| 7,711,635 B2 | 5/2010 | Steele et al. |
| 7,739,139 B2 | 6/2010 | Robertson et al. |
| 7,747,559 B2 | 6/2010 | Leitner et al. |
| 7,752,236 B2 | 7/2010 | Williams et al. |
| 7,756,789 B2 | 7/2010 | Welker et al. |
| 7,761,384 B2 | 7/2010 | Madhogarhia |
| 7,765,148 B2 | 7/2010 | German et al. |
| 7,765,311 B2 | 7/2010 | Itabashi et al. |
| 7,769,696 B2 | 8/2010 | Yoda |
| 7,769,697 B2 | 8/2010 | Fieschi et al. |
| 7,774,270 B1 | 8/2010 | MacCloskey |
| 7,792,715 B1 | 9/2010 | Kasower |
| 7,797,252 B2 | 9/2010 | Rosskamm et al. |
| 7,797,725 B2 | 9/2010 | Lunt et al. |
| 7,802,104 B2 | 9/2010 | Dickinson |
| 7,814,005 B2 | 10/2010 | Imrey et al. |
| 7,818,228 B1 | 10/2010 | Coulter |
| 7,827,115 B2 | 11/2010 | Weller et al. |
| 7,841,008 B1 | 11/2010 | Cole et al. |
| 7,853,493 B2 | 12/2010 | DeBie et al. |
| 7,970,679 B2 | 6/2011 | Kasower |
| 7,983,932 B2 | 7/2011 | Kane |
| 7,991,689 B1 | 8/2011 | Brunzell et al. |
| 7,991,901 B2 | 8/2011 | Tarquini et al. |
| 7,996,912 B2 | 8/2011 | Spalink et al. |
| 8,001,042 B1 | 8/2011 | Brunzell et al. |
| 8,005,759 B2 | 8/2011 | Hirtenstein et al. |
| 8,095,443 B2 | 1/2012 | DeBie |
| 8,095,458 B2 | 1/2012 | Peterson et al. |
| 8,099,341 B2 | 1/2012 | Varghese |
| 8,127,986 B1 | 3/2012 | Taylor et al. |
| 8,195,549 B2 | 6/2012 | Kasower |
| 8,234,498 B2 | 7/2012 | Britti et al. |
| 8,285,656 B1 | 10/2012 | Chang et al. |
| 8,290,840 B2 | 10/2012 | Kasower |
| 8,312,033 B1 | 11/2012 | McMillan et al. |
| 8,321,952 B2 | 11/2012 | Spalink et al. |
| 8,355,967 B2 | 1/2013 | Debie et al. |
| 8,392,334 B2 | 3/2013 | Hirtenstein et al. |
| 8,463,919 B2 | 6/2013 | Tarquini et al. |
| 8,515,844 B2 | 8/2013 | Kasower |
| 2001/0011245 A1 | 8/2001 | Duhon |
| 2001/0029482 A1 | 10/2001 | Tealdi et al. |
| 2001/0049620 A1 | 12/2001 | Blasko |
| 2002/0004736 A1 | 1/2002 | Roundtree et al. |
| 2002/0013899 A1 | 1/2002 | Faul |
| 2002/0026507 A1 | 2/2002 | Sears et al. |

(56) References Cited

U.S. PATENT DOCUMENTS

| | | |
|---|---|---|
| 2002/0026519 A1 | 2/2002 | Itabashi et al. |
| 2002/0035684 A1 | 3/2002 | Vogel et al. |
| 2002/0069122 A1 | 6/2002 | Yun et al. |
| 2002/0077964 A1 | 6/2002 | Brody et al. |
| 2002/0087460 A1 | 7/2002 | Hornung |
| 2002/0099628 A1 | 7/2002 | Yakaoka et al. |
| 2002/0099635 A1 | 7/2002 | Guiragosian |
| 2002/0099824 A1 | 7/2002 | Bender et al. |
| 2002/0103809 A1 | 8/2002 | Starzl et al. |
| 2002/0128962 A1 | 9/2002 | Kasower |
| 2002/0133462 A1 | 9/2002 | Shteyn |
| 2002/0133504 A1 | 9/2002 | Vlahos et al. |
| 2002/0156676 A1 | 10/2002 | Ahrens et al. |
| 2002/0161664 A1 | 10/2002 | Shaya et al. |
| 2002/0169747 A1 | 11/2002 | Chapman et al. |
| 2002/0173994 A1 | 11/2002 | Ferguson, III |
| 2002/0188544 A1 | 12/2002 | Wizon et al. |
| 2002/0194120 A1 | 12/2002 | Russell et al. |
| 2002/0198824 A1 | 12/2002 | Cook |
| 2003/0009418 A1 | 1/2003 | Green et al. |
| 2003/0018578 A1 | 1/2003 | Schultz |
| 2003/0097342 A1 | 5/2003 | Whittingtom |
| 2003/0097380 A1 | 5/2003 | Mulhern et al. |
| 2003/0101344 A1 | 5/2003 | Wheeler et al. |
| 2003/0105728 A1 | 6/2003 | Yano et al. |
| 2003/0212654 A1 | 11/2003 | Harper et al. |
| 2003/0229892 A1 | 12/2003 | Sardera |
| 2004/0006488 A1 | 1/2004 | Fitall et al. |
| 2004/0006536 A1 | 1/2004 | Kawashima et al. |
| 2004/0010458 A1 | 1/2004 | Friedman |
| 2004/0030649 A1 | 2/2004 | Nelson et al. |
| 2004/0044563 A1 | 3/2004 | Stein |
| 2004/0078323 A1 | 4/2004 | Johnston et al. |
| 2004/0088237 A1* | 5/2004 | Moenickheim et al. ......... 705/35 |
| 2004/0088255 A1* | 5/2004 | Zielke et al. ................... 705/40 |
| 2004/0098625 A1 | 5/2004 | Lagadec et al. |
| 2004/0111359 A1 | 6/2004 | Hudock |
| 2004/0117358 A1 | 6/2004 | Von Kaenel et al. |
| 2004/0128150 A1 | 7/2004 | Lundegren |
| 2004/0133509 A1* | 7/2004 | McCoy et al. ................... 705/39 |
| 2004/0133513 A1* | 7/2004 | McCoy et al. ................... 705/40 |
| 2004/0133515 A1* | 7/2004 | McCoy et al. ................... 705/40 |
| 2004/0139025 A1 | 7/2004 | Coleman |
| 2004/0143546 A1* | 7/2004 | Wood et al. ..................... 705/40 |
| 2004/0153330 A1 | 8/2004 | Miller et al. |
| 2004/0153521 A1 | 8/2004 | Kogo |
| 2004/0177035 A1 | 9/2004 | Silva |
| 2004/0199456 A1 | 10/2004 | Flint et al. |
| 2004/0199789 A1 | 10/2004 | Shaw et al. |
| 2004/0225594 A1 | 11/2004 | Nolan, III et al. |
| 2004/0230534 A1 | 11/2004 | McGough |
| 2004/0236688 A1 | 11/2004 | Bozeman |
| 2005/0005168 A1 | 1/2005 | Dick |
| 2005/0021476 A1 | 1/2005 | Candella et al. |
| 2005/0027995 A1 | 2/2005 | Menschik et al. |
| 2005/0055231 A1 | 3/2005 | Lee |
| 2005/0137899 A1 | 6/2005 | Davies et al. |
| 2005/0154664 A1 | 7/2005 | Guy et al. |
| 2005/0192008 A1 | 9/2005 | Desai et al. |
| 2005/0251474 A1 | 11/2005 | Shinn et al. |
| 2005/0279827 A1 | 12/2005 | Mascavage et al. |
| 2005/0288998 A1 | 12/2005 | Verma et al. |
| 2006/0020611 A1 | 1/2006 | Gilbert et al. |
| 2006/0032909 A1 | 2/2006 | Seegar |
| 2006/0059110 A1 | 3/2006 | Madhok et al. |
| 2006/0074991 A1 | 4/2006 | Lussier et al. |
| 2006/0080263 A1 | 4/2006 | Willis et al. |
| 2006/0106670 A1 | 5/2006 | Cai et al. |
| 2006/0131390 A1 | 6/2006 | Kim |
| 2006/0155573 A1 | 7/2006 | Hartunian |
| 2006/0173776 A1 | 8/2006 | Shalley et al. |
| 2006/0178971 A1 | 8/2006 | Owen et al. |
| 2006/0184440 A1 | 8/2006 | Britti et al. |
| 2006/0200396 A1 | 9/2006 | Satterfield et al. |
| 2006/0223043 A1 | 10/2006 | Dancy-Edwards et al. |
| 2006/0239512 A1 | 10/2006 | Petrillo |
| 2006/0242047 A1 | 10/2006 | Haggerty et al. |
| 2006/0271456 A1 | 11/2006 | Romain et al. |
| 2006/0271457 A1 | 11/2006 | Romain et al. |
| 2006/0271472 A1 | 11/2006 | Cagan |
| 2006/0277092 A1 | 12/2006 | Williams |
| 2006/0282359 A1 | 12/2006 | Nobili et al. |
| 2007/0022297 A1 | 1/2007 | Britti et al. |
| 2007/0038483 A1 | 2/2007 | Wood |
| 2007/0038497 A1 | 2/2007 | Britti et al. |
| 2007/0067437 A1 | 3/2007 | Sindambiwe |
| 2007/0072190 A1 | 3/2007 | Aggarwal |
| 2007/0078985 A1 | 4/2007 | Shao et al. |
| 2007/0083460 A1 | 4/2007 | Bachenheimer |
| 2007/0093234 A1 | 4/2007 | Willis et al. |
| 2007/0112668 A1 | 5/2007 | Celano et al. |
| 2007/0118393 A1 | 5/2007 | Rosen et al. |
| 2007/0124256 A1 | 5/2007 | Crooks et al. |
| 2007/0156554 A1 | 7/2007 | Nikoley et al. |
| 2007/0174448 A1 | 7/2007 | Ahuja et al. |
| 2007/0205266 A1 | 9/2007 | Carr et al. |
| 2007/0220611 A1 | 9/2007 | Socolow et al. |
| 2007/0226047 A1 | 9/2007 | Ward |
| 2007/0244807 A1 | 10/2007 | Andringa et al. |
| 2007/0250459 A1 | 10/2007 | Schwarz et al. |
| 2007/0261114 A1 | 11/2007 | Pomerantsev |
| 2007/0262140 A1 | 11/2007 | Long, Sr. |
| 2007/0282730 A1 | 12/2007 | Carpenter et al. |
| 2007/0282736 A1 | 12/2007 | Conlin et al. |
| 2007/0288355 A1 | 12/2007 | Roland et al. |
| 2007/0288360 A1 | 12/2007 | Seeklus |
| 2007/0299759 A1 | 12/2007 | Kelly |
| 2008/0010206 A1 | 1/2008 | Coleman |
| 2008/0010687 A1 | 1/2008 | Gonen et al. |
| 2008/0033742 A1 | 2/2008 | Bernasconi |
| 2008/0052244 A1 | 2/2008 | Tsuei et al. |
| 2008/0059224 A1 | 3/2008 | Schechter |
| 2008/0059352 A1 | 3/2008 | Chandran |
| 2008/0066188 A1 | 3/2008 | Kwak |
| 2008/0077526 A1 | 3/2008 | Arumugam |
| 2008/0091519 A1 | 4/2008 | Foss |
| 2008/0095441 A1 | 4/2008 | Rosskamm et al. |
| 2008/0103800 A1 | 5/2008 | Domenikos et al. |
| 2008/0103972 A1 | 5/2008 | Lanc |
| 2008/0109444 A1 | 5/2008 | Williams et al. |
| 2008/0109875 A1 | 5/2008 | Kraft |
| 2008/0115191 A1 | 5/2008 | Kim et al. |
| 2008/0126233 A1 | 5/2008 | Hogan |
| 2008/0162383 A1 | 7/2008 | Kraft |
| 2008/0175360 A1 | 7/2008 | Schwarz et al. |
| 2008/0183480 A1 | 7/2008 | Carlson et al. |
| 2008/0183504 A1 | 7/2008 | Highley |
| 2008/0195548 A1 | 8/2008 | Chu et al. |
| 2008/0205655 A1 | 8/2008 | Wilkins et al. |
| 2008/0208873 A1 | 8/2008 | Boehmer |
| 2008/0221972 A1 | 9/2008 | Megdal |
| 2008/0222027 A1 | 9/2008 | Megdal et al. |
| 2008/0263058 A1 | 10/2008 | Peden |
| 2008/0270209 A1 | 10/2008 | Mauseth et al. |
| 2008/0288299 A1 | 11/2008 | Schultz |
| 2008/0294501 A1 | 11/2008 | Rennich |
| 2008/0301016 A1 | 12/2008 | Durvasula et al. |
| 2008/0306750 A1 | 12/2008 | Wunder et al. |
| 2009/0006230 A1 | 1/2009 | Lyda et al. |
| 2009/0024484 A1 | 1/2009 | Walker et al. |
| 2009/0031426 A1 | 1/2009 | Dal Lago et al. |
| 2009/0037332 A1 | 2/2009 | Cheung et al. |
| 2009/0043691 A1 | 2/2009 | Kasower |
| 2009/0055894 A1 | 2/2009 | Lorsch |
| 2009/0060343 A1 | 3/2009 | Rosca |
| 2009/0094674 A1 | 4/2009 | Schwartz et al. |
| 2009/0106141 A1 | 4/2009 | Becker |
| 2009/0106846 A1 | 4/2009 | Dupray et al. |
| 2009/0112650 A1 | 4/2009 | Iwane |
| 2009/0125369 A1 | 5/2009 | Kloostra et al. |
| 2009/0126013 A1 | 5/2009 | Atwood et al. |
| 2009/0138335 A1 | 5/2009 | Lieberman |
| 2009/0150166 A1 | 6/2009 | Leite et al. |
| 2009/0150238 A1 | 6/2009 | Marsh et al. |

(56) References Cited

U.S. PATENT DOCUMENTS

| | | |
|---|---|---|
| 2009/0177529 A1 | 7/2009 | Hadi |
| 2009/0198557 A1 | 8/2009 | Wang et al. |
| 2009/0198602 A1 | 8/2009 | Wang et al. |
| 2009/0228918 A1 | 9/2009 | Rolff et al. |
| 2009/0234665 A1 | 9/2009 | Conkel |
| 2009/0248573 A1 | 10/2009 | Haggerty et al. |
| 2009/0254476 A1 | 10/2009 | Sharma et al. |
| 2009/0260064 A1 | 10/2009 | Mcdowell et al. |
| 2009/0276368 A1 | 11/2009 | Martin et al. |
| 2009/0307778 A1 | 12/2009 | Mardikar |
| 2009/0328173 A1 | 12/2009 | Jakobson et al. |
| 2010/0023448 A1 | 1/2010 | Eze |
| 2010/0030677 A1 | 2/2010 | Melik-Aslanian et al. |
| 2010/0043055 A1 | 2/2010 | Baumgart |
| 2010/0094758 A1 | 4/2010 | Chamberlain et al. |
| 2010/0094768 A1 | 4/2010 | Miltonberger |
| 2010/0094774 A1 | 4/2010 | Jackowitz et al. |
| 2010/0100945 A1 | 4/2010 | Ozzie et al. |
| 2010/0114724 A1 | 5/2010 | Ghosh et al. |
| 2010/0114747 A1 | 5/2010 | Kasower |
| 2010/0114776 A1 | 5/2010 | Weller et al. |
| 2010/0130172 A1 | 5/2010 | Vendrow et al. |
| 2010/0145836 A1 | 6/2010 | Baker et al. |
| 2010/0169159 A1 | 7/2010 | Rose et al. |
| 2010/0179906 A1 | 7/2010 | Hawkes |
| 2010/0205662 A1 | 8/2010 | Ibrahim et al. |
| 2010/0229245 A1 | 9/2010 | Singhal |
| 2010/0241535 A1 | 9/2010 | Nightengale et al. |
| 2010/0250364 A1 | 9/2010 | Song et al. |
| 2010/0250411 A1 | 9/2010 | Ogrodski |
| 2010/0250497 A1 | 9/2010 | Redlich et al. |
| 2010/0280914 A1 | 11/2010 | Carlson |
| 2011/0004498 A1 | 1/2011 | Readshaw |
| 2011/0016042 A1 | 1/2011 | Cho et al. |
| 2011/0035788 A1 | 2/2011 | White et al. |
| 2011/0060905 A1 | 3/2011 | Stack et al. |
| 2011/0137760 A1 | 6/2011 | Rudie et al. |
| 2011/0164746 A1 | 7/2011 | Nice et al. |
| 2011/0166988 A1 | 7/2011 | Coulter |
| 2011/0219421 A1 | 9/2011 | Ullman et al. |
| 2012/0022990 A1 | 1/2012 | Kasower |
| 2012/0136763 A1 | 5/2012 | Megdal et al. |
| 2012/0158574 A1 | 6/2012 | Brunzell et al. |
| 2012/0265607 A1 | 10/2012 | Belwadi |
| 2013/0018811 A1 | 1/2013 | Britti et al. |
| 2013/0031624 A1 | 1/2013 | Britti et al. |
| 2013/0110557 A1 | 5/2013 | Kasower |
| 2013/0124392 A1 | 5/2013 | Achanta et al. |
| 2013/0173481 A1 | 7/2013 | Hirtenstein et al. |
| 2013/0211986 A1 | 8/2013 | Debie et al. |

FOREIGN PATENT DOCUMENTS

| | | |
|---|---|---|
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2004-0078798 | 9/2004 |
| WO | WO 01/84284 A1 | 11/2001 |
| WO | WO 2004/114160 | 12/2004 |
| WO | WO 2008/022289 | 2/2008 |
| WO | WO 2008/054403 | 5/2008 |
| WO | WO 2009/117518 | 9/2009 |
| WO | WO 2010/132492 | 11/2010 |
| WO | WP 2013/009920 | 1/2013 |

OTHER PUBLICATIONS

Ideon, Creit-Card Registry That Bellyflopped this Year, Is Drawing some Bottom-Fishers. The Wall Street Journal, Aug. 21, 1994, p. C2.

U.S. Appl. No. 12/220,320, filed Jul. 23, 2008, Brunzell et al.

U.S. Appl. No. 12/705,489, filed Feb. 12, 2010, Bargoli et al.

U.S. Appl. No. 12/705,511, field Feb. 12, 2010, Bargoli et al.

Darren J. Waggoner, "Global Identity Crisis", Collections Credit Risk, Aug. 2001, vol. 6, No. 8.

Julie Rawe, "Identity Thieves", Time Bonus Section, Inside Business, Feb. 2002.

LifeLock, "How LifeLock Works," http://www.lifelock.com/lifelock-for-people, accessed on Mar. 14, 2008.

LifeLock, "LifeLock Launches First ID Theft Prevention Program for the Protection of Children," Oct. 14, 2005 Press Release, posted on http://www.lifelock.com/about-us/press-room/2005-press-releases/lifelock-protection-for-children, accessed on Mar. 14, 2008.

LifeLock; "How can LifeLock protect my kids and family?," http//www.lifelock.com/lifelock-for-people/how-we-do-it/how-can-lifelock-protect-my-kids-and-family, accessed on Mar. 14, 2008.

MAGID, Lawrence, J. , Business Tools: When Selecting an ASP Ensure Data Mobility, Los Angeles Times, Feb. 26, 2001, vol. C, Issue 4, pp. 3 pages, Los Angeles, CA.

Privacy Rights Clearinghouse: Identity Theft—"What to do if it happens to you" (www.privacyrights.org) (1999).

Ramaswamy, Vinita M. "Identify-Theft Toolkit". The CPA Journal. New York: Oct. 2006, vol. 76, Iss. 10; p. 66, (5 pages).

Truston, "Checking if your child is an ID theft victim can be stressful," as posted by Michelle Pastor on Jan. 22, 2007 at http://www.mytruston.com/blog/credit/checking_if_your_child_is_an_id_theft_vi.html.

W.A. Lee, American Banker: The Financial Services Daily, Experian, on Deal Hunt, Nets Identity Theft Insurer, Jun. 4, 2003.

CreditKarma, http://www.creditkarma.com printed Feb. 8, 2013 in 2 pages.

CreditSesame, http://www.creditsesame.com/how-it-works/our-technology/ printed Feb. 5, 2013 in 2 pages.

"Debt Settlement: Watch Video on how to Pay Your Debt Faster", http://www.debtconsolidationcare.com/debt-settlement.html printed Jan. 9, 2013 in 6 pages.

Expensr.com http://www.expensr.com/, as retrieved on Sep. 17, 2008.

Hoofnagle, Chris Jay, "Identity Theft: Making the Known Unknowns Known," Harvard Journal of Law & Technology, Fall 2007, vol. 21, No. 1, pp. 98-122.

Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.

LifeLock, Various Pages, www.lifelock.com/, 2007.

Mint.com, http://www.mint.com/how-it-works/ printed Feb. 5, 2013 in 2 pages.

Planwise, http://planwise.com printed Feb. 8, 2013 in 5 pages.

"PremierGuide Announces Release 3.0 of Local Search Platform", Business Wire, Mar. 4, 2004, Palo Alto, CA, p. 5574.

"Qualifying for Debt Settlement", http://www.certifieddebt.com/debt/settlement-qualifications.shtml printed Jan. 9, 2013 in 2 pages.

"Resolve Debt for Less: With Help from Freedom Financial" http://www.debtsettlementusa.com/ printed Jan. 9, 2013 in 6 pages.

"Settling Your Debts—Part 1 in Our Debt Settlement Series", http://www.creditinfocenter.com/debt/settle_debts.shtml printed Jan. 9, 2013 in 6 pages.

Chores & Allowances. "Do Kids Have Credit Reports?" http://choresandallowances.blogspot.com/2007/10/do-kids-have-credit-reports.html Oct. 15, 2007 as printed May 31, 2011.

Credit Sesame; "FAQ's"; http://www.creditsesame.com/how-we-help/faqs/#cb as printed Dec. 5, 2011.

(56) References Cited

OTHER PUBLICATIONS

Credit Sesame; "Promote Your Financial Responsibility to Get an Edge in Life"; http://www.creditsesame.com/credit-badge/ as accessed on Dec. 2, 2011.
"Consumers Gain Immediate and Full Access to Credit Score Used by Majority of U.S. Lenders." PR Newswire, ProQuest Copy; Mar. 19, 2001; p. 1.
Gibbs, Adrienne; "Protecting Your Children from Identity Theft," http://www.creditcards.com/credit-card-news/identity-ID-theft-and-kids-children-1282.php, Nov. 25, 2008 as printed Jul. 5, 2011.
ID Theft Assist, "Do You Know Where Your Child's Credit Is?" http://www.idtheftassist.com/pages/story14, Nov. 26, 2007, as printed May 31, 2011.
"Japan's JAAI system appraises used cars over internet", Asia Pulse Mar. 3, 2000.
Loshin, Intelligent Enterprise: Better Insight for Business Decisions, "Value-Added Data: Merge Ahead", Feb. 9, 2000, vol. 3, No. 3, pp. 5.
Miller, Joe, "NADA used-car prices go online". Automotive News, Jun. 14, 1999, p. 36.
Sawyers, Arlene "NADA to offer residual guide". Automotive News, May 22, 2000, p. 3.
Sax, Michael M., Data Collection and Privacy Protection: An International Perspective, Presentation: Managing Online Risk and Liability Conference, Aug. 31, 1999, pp. 58.
Tao, Lixin; "Shifting Paradigms with the Application Service Provider Model"; Concordia University, Canada; IEEE; Oct. 2001.
Vamosi, Robert, "How to Handle ID Fraud's Youngest Victims," http://news.cnet.com/8301-10789_3-10105303-57.html, Nov. 21, 2008 as printed May 31, 2011.
"WashingtonPost.com and Cars.com launch comprehensive automotive web site for the Washington area". PR Newswire, Oct. 22, 1998.

\* cited by examiner

PRIOR ART

FIG. 3

NEW MEMBER REGISTRATION

SIGN UP NOW!
PLEASE PROVIDE THE FOLLOWING INFORMATION SO THAT WE CAN CREATE A PROFILE AND YOU CAN ACCESS YOUR CARD PROTECTION SERVICES.
PLEASE NOTE THAT ALL BOLD FIELDS ARE REQUIRED.

TITLE: MR. ▼ (MR., MRS., ETC.)
FIRST NAME: TATYANA
MIDDLE INITIAL:
LAST NAME: ELIZER
SUFFIX: (JR., SR., II ETC.)
MARITAL STATUS: ● MARRIED
○ SINGLE
○ DIVORCED
○ SEPARATED
○ WIDOWED

SPOUSE'S FIRST NAME: KEVIN
ADDRESS: 18609 GALA STREET

PRIOR ART
FIG. 5

REGISTRATION CHECK

IN ORDER TO CHECK IF YOU ARE A REGISTERED USER, PLEASE PROVIDE US WITH THE FOLLOWING INFORMATION.

LAST NAME:

MOTHER'S MAIDEN NAME:

EMAIL:

[CHECK FOR REGISTRATION]  [CANCEL]

PRIOR ART
FIG. 8

WELCOME

PLEASE CHOOSE THE SERVICE YOU REQUIRE:

MEMBER SERVICES
LOST/STOLEN CARD REPORT
ADDRESS CHANGE NOTIFICATION
NEW/REPLACEMENT CARD REQUEST
CHARGE DISPUTE NOTIFICATION
COPY STATEMENT REQUEST
NAME/MARITAL STATUS CHANGE NOTIFICATION
CREDIT INCREASE REQUEST

YOUR INFORMATION
EDIT/VIEW PROFILE
EDIT/VIEW REGISTERED CARDS
REGISTER NEW CARDS
VIEW SERVICES HISTORY

CANCEL SERVICE

LOG OUT

SECURITY & PRIVACY | FAQ | TERMS & CONDITIONS

PRIOR ART
FIG. 10

DEXTER & APRIL COLLINS
APRILLE@MIGHTYNET.COM

CANCEL SERVICE

ARE YOU SURE YOU WISH TO CANCEL YOUR CARD PROTECTION SERVICES?

YES  NO (RETURN TO CARDLINK MENU)

PRIOR ART
FIG. 12

CONNECTION TYPE: (REQUIRED)    [SELECT CONNECTION TYPE ▼]

CONNECTION SPEED: (REQUIRED)   [SELECT CONNECTION SPEED ▼]

INTERNET SERVICE PROVIDER: (REQUIRED)   [          ]

REQUEST TYPE: (REQUIRED)    [ ▼ ]

QUESTION, BUG REPORT OR PROBLEM: (REQUIRED)    [          ]

PLEASE PRESS ONLY ONCE.
[SUBMIT] [CLEAR]
PLEASE READ BEFORE SENDING

PRIOR ART
FIG. 19

REQUEST NEW / REPLACEMENT CARD(S)    DEXTER & APRIL COLLINS
                                      APRILLE@MIGHTYNET.COM

PLEASE SELECT THE CARD(S) FOR WHICH YOU ARE REQUESTING A NEW OR REPLACEMENT CARD.

CLICK HERE TO REGISTER A CARD YOU DON'T SEE ON THIS LIST BEFORE CONTINUING.

| CARD | CARD NUMBER | CARDHOLDER |
|---|---|---|
| ☐ SELECT ALL CARDS | | |
| ☐ ABBEY NATIONAL CHEQUE GUARANTEE | 1342154236356 | DEXTER LIPTON |
| ☐ BANK OF IRELAND MASTER CARD | ASD23423421341Z | R.DEXTER LIPTON |
| ☐ CAHOOT CREDIT CARD | | DEXTER LIPTON |
| ☐ COSTCO | 4536262736 | APRILLE |

PLEASE SELECT A REASON FOR REQUESTING NEW/REPLACEMENT CARD(S):
⦿ CARD(S) DAMAGED
○ ADDITIONAL CARD(S) REQUIRED
○ OTHER

ENTER THE PERSON WHOSE NAME SHOULD APPEAR ON THESE CARD(S):
[          ]

[ NEXT ]

PRIOR ART
FIG. 21

| LOSS REPORT | DEXTER & APRIL COLLINS |
| --- | --- |
| | APRILLE@MIGHTYNET.COM |

PLEASE SELECT THOSE CARDS YOU WISH TO REPORT AS MISSING.
CLICK HERE TO REGISTER A CARD YOU DON'T SEE ON THIS LIST BEFORE CONTINUING.

| CARD | CARD NUMBER | CARDHOLDER |
| --- | --- | --- |
| ☐ SELECT ALL CARDS | | |
| ☐ ABBEY NATIONAL CHEQUE GUARANTEE | | |
| ☐ BANK OF IRELAND MASTER CARD | 1342515 4236356 | DEXTER LIPTON |
| ☐ CAHOOT CREDIT CARD | ASD234234213412 | R. DEXTER LIPTON |
| ☐ COSTCO | 4536 26 27 36 | APRILLE |
| ☐ CREDIT LYONNAYS VISA ATM | 12381239178923 | DEXTER LIPTON |
| ☐ CREDIT LYONNAYS VISA ATM | 12381239178923 | DEXTER LIPTON |
| ☐ DICKENS | 4673568 4786758 | APRILLE COLLINS |
| ☐ FIRST DIRECT VISA | 23453 426235 4624 | DEXTER LIPTON |

CARD-LINK™ NOTIFICATION TREE - EXCEPTION

PRIOR ART
FIG. 29

ADDRESS CHANGE

DEXTER & APRIL COLLINS
APRILLE@MIGHTYNET.COM

PLEASE MAKE THE NECESSARY CHANGES TO YOUR ADDRESS BELOW:

YOUR ADDRESS IS CURRENTLY LISTED AS:

1069 ERRINGER ROAD
SIMI VALLEY P4F 9JO
UK
PHONE:(805) 522-8347   ALTERNATE PHONE:(805) 522-5462

PLEASE ENTER YOUR NEW ADDRESS INFORMATION BELOW:
BOLD FIELDS ARE REQUIRED.

☐ NOTIFY ALL CARD ISSUERS OF ADDRESS CHANGE?
PLEASE NOTE THAT TICKING THIS BOX MEANS YOUR CARD ISSUERS WILL BE NOTIFIED OF THIS ADDRESS CHANGE, EXCEPT THOSE CARDS FOR WHICH YOU REGISTERED AN ALTERNATE BILLING ADDRESS.

PRIOR ART
FIG. 31

DEXTER & APRIL LIPTON
APRILLE@MIGHTYNET.COM

PLEASE SELECT THE CHANGE YOU WISH TO MAKE :

● CHANGE NAME
○ CHANGE MARITAL STATUS

NEXT (RETURN TO CARDLINK MENU)

PRIOR ART
FIG. 33

CREDIT LIMIT INCREASE REQUEST  DEXTER & APRIL COLLINS
APRILLE@MIGHTYNET.COM

PLEASE SELECT THE CARD FROM WHICH YOU WISH TO REQUEST A CREDIT LIMIT INCREASE.

CLICK HERE TO REGISTER A CARD YOU DON'T SEE ON THIS LIST BEFORE CONTINUING.

| CARD | CARD NUMBER | CARDHOLDER |
|---|---|---|
| ○ ABBEY NATIONAL CHEQUE GUARANTEE | | |
| ○ APRILLES AL VISA DEBIT | 189273897 | DEXTER LIPTON |
| ○ APRILLES VISA | 12312019823 019283 | APRIL M. COLLINS |
| ○ ARDING HOBBS | 0897123498134 | APRILLE M. COLLINS |
| ○ THE ASSOCIATES VISA | 98327948234 | MR. MRS. LIPTON |
| ○ THE ASSOCIATES VISA | 98327948234 | DEXTER LIPTON |

[NEXT]

PRIOR ART

FIG. 35

CHARGE DISPUTE  DEXTER & APRIL LIPTON
APRILLE@MIGHTYNET.COM

PLEASE SELECT THE CARD AGAINST WHICH YOU WISH TO DISPUTE CHARGES.

CLICK HERE TO REGISTER A CARD YOU DON'T SEE ON THIS LIST BEFORE CONTINUING, OR
CLICK HERE TO REGISTER A CHANGE DISPUTE AGAINST A LOST, STOLEN, OR PREVIOUSLY DELETED CARD.

CURRENT CARDS

| CARD | CARD NUMBER | CARDHOLDER |
|---|---|---|
| ○ ABBEY NATIONAL CHEQUE GUARANTEE | | |
| ○ APRILLES AL VISA DEBIT | 189273897 | DEXTER LIPTON |
| ○ APRILLES VISA | 12312 019823 019283 | APRIL M. COLLINS |
| ○ ARDING HOBBS | 089712 3498134 | APRILLE M. COLLINS |
| ○ BANK OF IRELAND MASTERCARD | 1342515 4236356 | MR. MRS. LIPTON |
| ○ CAHOOT CREDIT CARD | ASD 2342342 1342 | R. DEXTER LIPTON |
| | | DEXTER LIPTON |

[NEXT]

(RETURN TO CARDLINK MENU)

PRIOR ART

FIG. 36

COPY STATEMENT REQUEST     DEXTER & APRIL LIPTON
APRILLE@MIGHTYNET.COM

PLEASE SELECT THE CARD FOR WHICH YOU WISH TO HAVE A COPY STATEMENT.

PLEASE NOTE: SOME ISSUERS MAY MAKE A CHARGE FOR COPY STATEMENTS.

<u>CLICK HERE TO REGISTER A CARD YOU DON'T SEE ON THIS LIST BEFORE CONTINUING.</u>

| CARD | CARD NUMBER | CARDHOLDER |
|---|---|---|
| ○ ABBEY NATIONAL CHEQUE GUARANTEE | | DEXTER LIPTON |
| ○ APRILLES AL VISA DEBIT | 1892738997 | APRIL M. COLLINS |
| ○ APRILLES VISA | 12312 019823 019283 | APRILLE M. COLLINS |
| ○ ARDING HOBBS | 0897123498134 | MR. MRS. LIPTON |
| ○ BANK OF IRELAND MASTERCARD | 13425154236356 | R. DEXTER LIPTON |

[ NEXT ]

(RETURN TO CARDLINK MENU)

FIGURE 39

Thank you for requesting automatic card registration. However, it appears that you have recently requested this service on <INSERT DATE>.

If you still wish to continue with automatic card registration, please choose the "Continue" button, below.

CANCEL       CONTINUE

FIGURE 40

In order to complete your request for automatic card registration, we will require your permission to obtain a copy of your credit file from <<CREDIT BUREAU>>. Your current credit cards will be identified from this file in order to automatically register them.

Full Name: _____
SSN: _____
Date of Birth: _____
Current Address: _____
Previous Address: _____

[CANCEL]  [CONTINUE]

FIGURE 41

Thank you.

The automatic registration of your credit cards is currently being performed. You will be notified via email at <<EMAIL>> as soon as the process is complete (usually within 15 minutes).

FIGURE 42

Your automatic card registration is complete.

To view the results, please choose the "Continue" button, below.

CANCEL    CONTINUE

CARD MANAGEMENT SYSTEM AND METHOD

PRIORITY INFORMATION

The present application is a Continuation Application of U.S. application Ser. No. 12/131,548 entitled "CARD MANAGEMENT SYSTEM AND METHOD" filed Jun. 2, 2008, which is a Continuation Application of U.S. application Ser. No. 10/393,699 entitled "CARD MANAGEMENT SYSTEM AND METHOD," filed Mar. 21, 2003 now U.S. Pat. No. 7,451,113 issued Nov. 11, 2008, both of which are herewith incorporated by reference in their entirety.

FIELD OF INVENTION

The present invention generally relates to a credit card management system, and more particularly to an on-line card management system accessible via a computer network, such as the Internet.

BACKGROUND OF THE INVENTION

The explosion in the use of multiple credit and charge cards in the late 1960s created the need for card protection. At the time, this need could be efficiently filled with 1960s enabling technology (e.g., minicomputer) and efficient communications (e.g., toll-free calls, telex, etc.). The demand for a "one call does it all" service for communicating with multiple card issuers for the purpose of limiting liability, reporting lost or stolen cards or changes of address made sales easy. Today, there has been a great explosion in the number and type of cards per household. Such cards include credit cards, charge cards, debit cards, ID cards, medical insurance cards, library cards, automobile club cards, discount cards, and membership cards.

The principle prior art method of reporting a change of address, requesting a new card, notification of a billing dispute, requesting a copy of a bill, reporting a change in marital status, reporting a lost or stolen card, or requesting an increase in credit line, required a phone call or written notification to the card issuer. This often required the cardholder to spend a substantial amount of time thereafter on "hold" until a service representative became available or navigating through an automated voice response system. The cardholder could also subscribe to a lost or stolen card service. Here the cardholder was required to submit a list of the cards and the associated data thereto by mail. Thus a significant amount of time could pass before protection was obtained. If a card was lost or stolen, the cardholder was required to telephone the service. Of course; any change in a card or the addition of a card required an additional letter.

U.S. patent application Ser. No. 09/846,616 entitled Card Management System And Method Therefore, by S. Kasower, filed May 1, 2001 discloses a method and system for on-line card management, wherein the card is issued to a card user by an issuing organization. The card user then interfaces with a card management organization via the card user's own computer through the Internet system to a computer system within the management organization. The computer system includes a computer program that processes the card user's request(s) concerning the cards(s) and the car issuer is informed of the car user's request via the Internet system. The computer program thereafter informs the card user that the card issuer has been informed. While the card management system provides all the needs of a card user, it does require that the user manually enter the credit card.

Thus it is a primary object of the invention to provide an improved card management method and system that harnesses modern communications and information technology to each and every card that a card user might carry.

It is another primary object of the invention to provide an improved card management method and system to extend card protection services to meet current cardholder expectations.

It is a further object of the invention to provide an improved card management method and system wherein the cardholder can conduct a multitude of transactions in a single connection to the Internet.

It is another object of the invention to provide an improved card management method and system to provide on-line card registration.

It is another object of the invention to provide an improved card management method and system that can instantly notify the card issuer of a lost or stolen card.

It is a still further object of the invention to provide a simplified method of providing credit card information to an entity such as a card management organization.

It is another object of the invention to integrate a simplified method of providing credit card information to a credit card management organization.

It is another object of the invention to provide a simplified method of providing credit card information to an entity such as a card management organization that only requires the card user to grant permission to card management organization to allow the organization to obtain necessary information.

SUMMARY OF THE INVENTION

The invention is a method of the obtaining a credit card user's credit card information on-line by a credit card management organization. In detail, the card user accesses a card management computer system in a computer network and provides the card management organization with authorization to obtain the card user's credit report from a credit reporting bureau. The card management organization requests the credit report from the bureau by means of the computer network. The card management organization extracts the required credit card data from the credit report transmitted by the credit bureau, loops through the extracted credit card data and attempts to match the credit card data to existing credit card issuers using the card management organization's internal proprietary algorithm and data base of card issuer's "aliases." The card management organization's computer checks the accuracy of the matched credit card data with the card user, and stores the verified and checked credit card data in the card management organization's computer system.

It should be appreciated that the card management system of the present invention is suitable for use in connection with a wide variety of cards, including but not limited to: credit cards, charge cards, ATM/debit cards and the like. In fact, any sort card that would appear on a credit report issued by a credit bureau can be automatically registered by the system and method described herein.

The invention has application to Applicant's co-pending patent application Ser. No. 09/846,616 entitled Card Management System and Method Therefore, by S. Kasower, filed May 1, 2001. The system, in a broad sense, is an on-line card management system, wherein the card is issued by a issuing organization, and includes: a computer system accessible via a computer network, the computer system having a selection program for selecting at least one of a plurality of card management services; an input program for inputting data associated with the selected card management service; and a program providing the data associated with a selected card management services to the issuing organization.

The method of the '616 application includes the steps of: accessing a card management computer system in a computer network; selecting at least one of a plurality of card management services provided by the computer system; inputting data associated with the selected card management service; and providing the associated data to the issuing organization.

Such card management services include registering at least one card by inputting associated card data, change of address, reporting a lost or stolen card, request for a new card, notification of a billing dispute, request for a copy of a bill, a change in marital status or name change and a request for an increase in credit line. Furthermore, a record of the associated data is maintained as well as providing a confirmation that the issuing organization has been contacted and provided the associated card data.

However, this prior invention required the card holder to use his or her personal computer terminal to contact the computer system via the Internet and to manually enter the credit card information. It is therefore clear that the use of the method claimed herein used with this existing card management system greatly improves the performance thereof.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF FIGURES

FIG. 3 a simplified view of the "new member registration" screen.

FIG. 5 is a simplified view of the "registration check" screen.

FIG. 8 is a simplified view of the screen for "selection of member services."

FIG. 10 is a simplified view of the screen for "canceling services."

FIG. 12 is a simplified view of a screen for "obtaining technical support" services.

FIG. 19 is a screen for "requesting a new or replacement cards when the card is already registered."

FIG. 21 is a screen for reporting a lost card.

FIG. 29 is the screen for reporting an "address change."

FIG. 31 is the screen for reporting a "change in name and or a change in marital status" services.

FIG. 33 is the screen for "requesting a credit increase for a credit card."

FIG. 35 is the screen for reporting a "charge dispute" made on a credit card.

FIG. 36 is the screen for "ordering a copy of a statement."

FIG. 39 is a typical screen for informing the individual user that they have recently requested automatic registration of credit cards.

FIG. 40 is a typical screen for authorization to obtain the credit report of the individual card user, FIG. 41 is a screen for informing the individual user that the automatic registration procedure has been started and that results will be provided shortly.

FIG. 42 is a screen for informing the individual user automatic registration has been completed.

DETAILED DESCRIPTION OF THE PREFERRED EMBODIMENT

Set forth below is an overview of a preferred embodiment of the present invention. It should be appreciated that, while a preferred embodiment of the present invention is described in connection with the Internet, the present invention is suitable for use in connection with other computer networks. Moreover, the method of card management of the present invention may be directly accessible, or accessible via a private computer network. In the following discussion of the invention, selected computer screens are used for purposes of illustration, but it will be obvious that additional screens are used, but not disclosed nor need they be for purposes of understanding the invention. However, it is first necessary to discuss the Ser. No. 9/846,616 system in detail.

Figure 1:
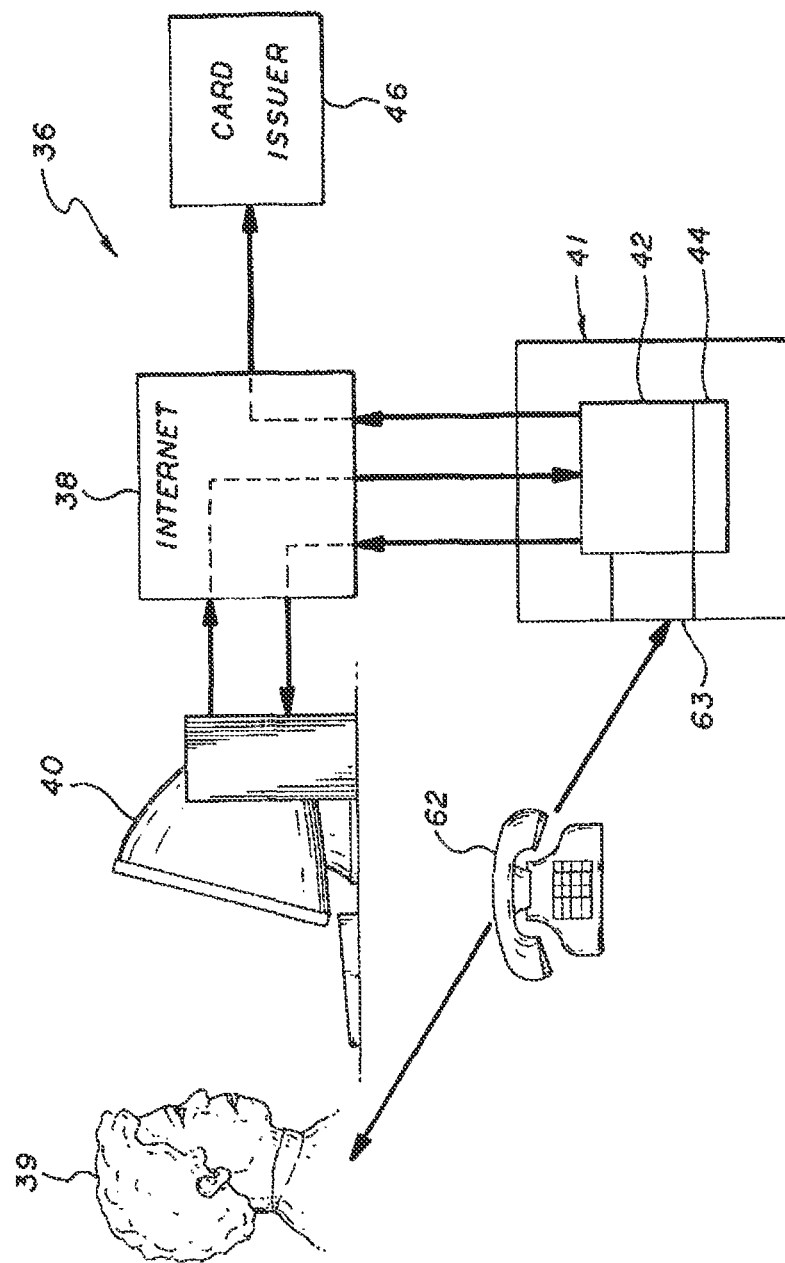
FIG. 1 is a simplified schematic of the card management system.

As illustrated FIG. 1, the prior art card management system, generally indicated by numeral 36, uses the Internet system 38 to interface with the individual card holder 39 via the individual's computer 40 and the card management organization 41. The card management organization 41 includes computers 42 having a card management computer program 44 therein which process data concerning the cards and provides associated card data to the card issuer 46 also via the Internet system 38. Provisions are provided for non-internet communication with the card user and the card issuer, as will be subsequently discussed.

Figure 2:
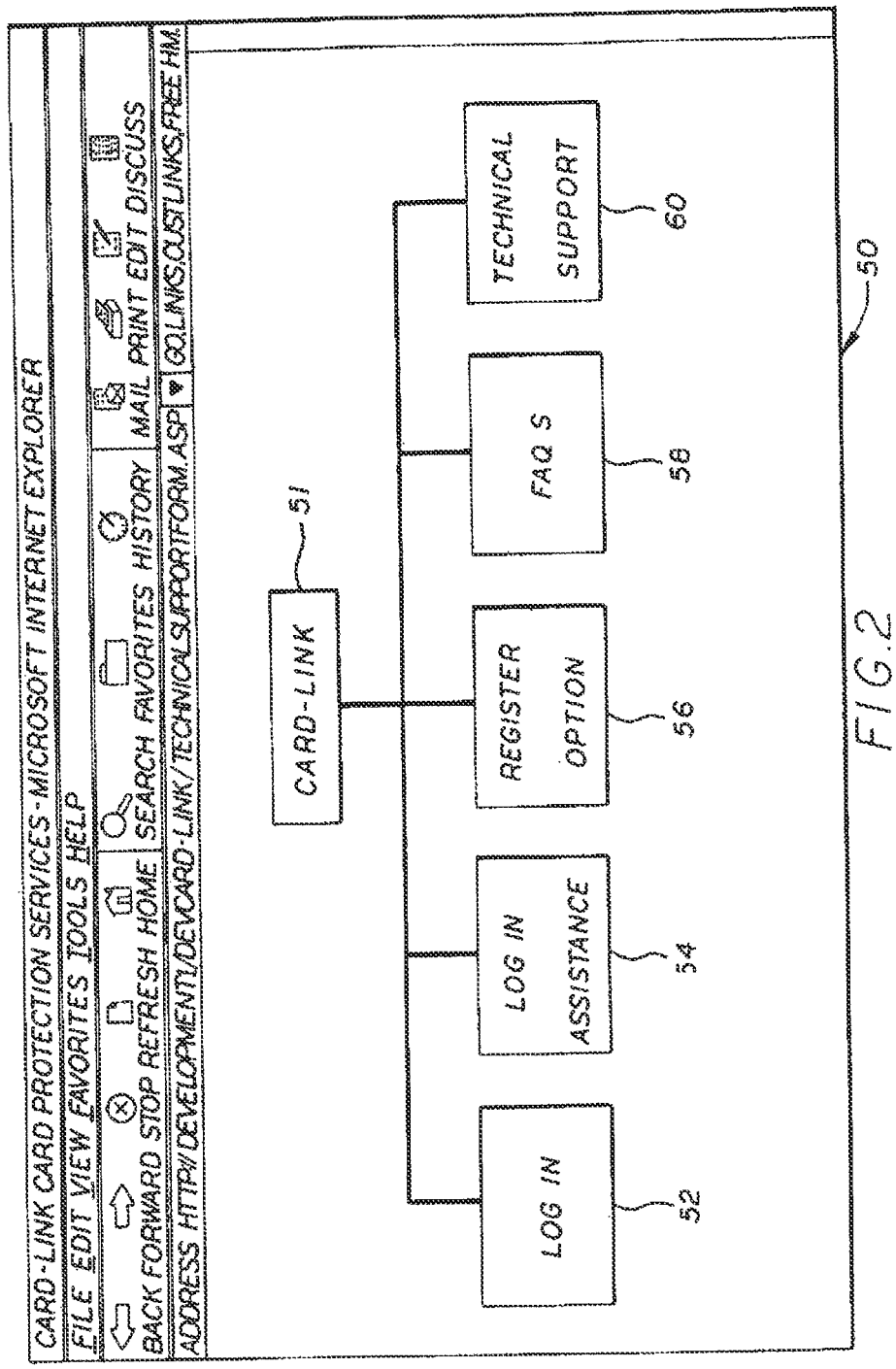
FIG. 2 is a view of the "site entry" screen.

As illustrated in FIG. 2, when the cardholder or user "pulls up" the main screen, generally indicated by numeral 50, it is either generic (if accessed directly) or customized (if accessed via a sponsor). The main screen includes a series of links: a log in option 52 to enter the user ID and password for the purpose of logging in, log in assistance link 54 for the customer who is not sure he is a member, or who has forgotten either his User ID or Password; registering link 56, frequently asked questions link 58 and technical support link 60

Figure 4:
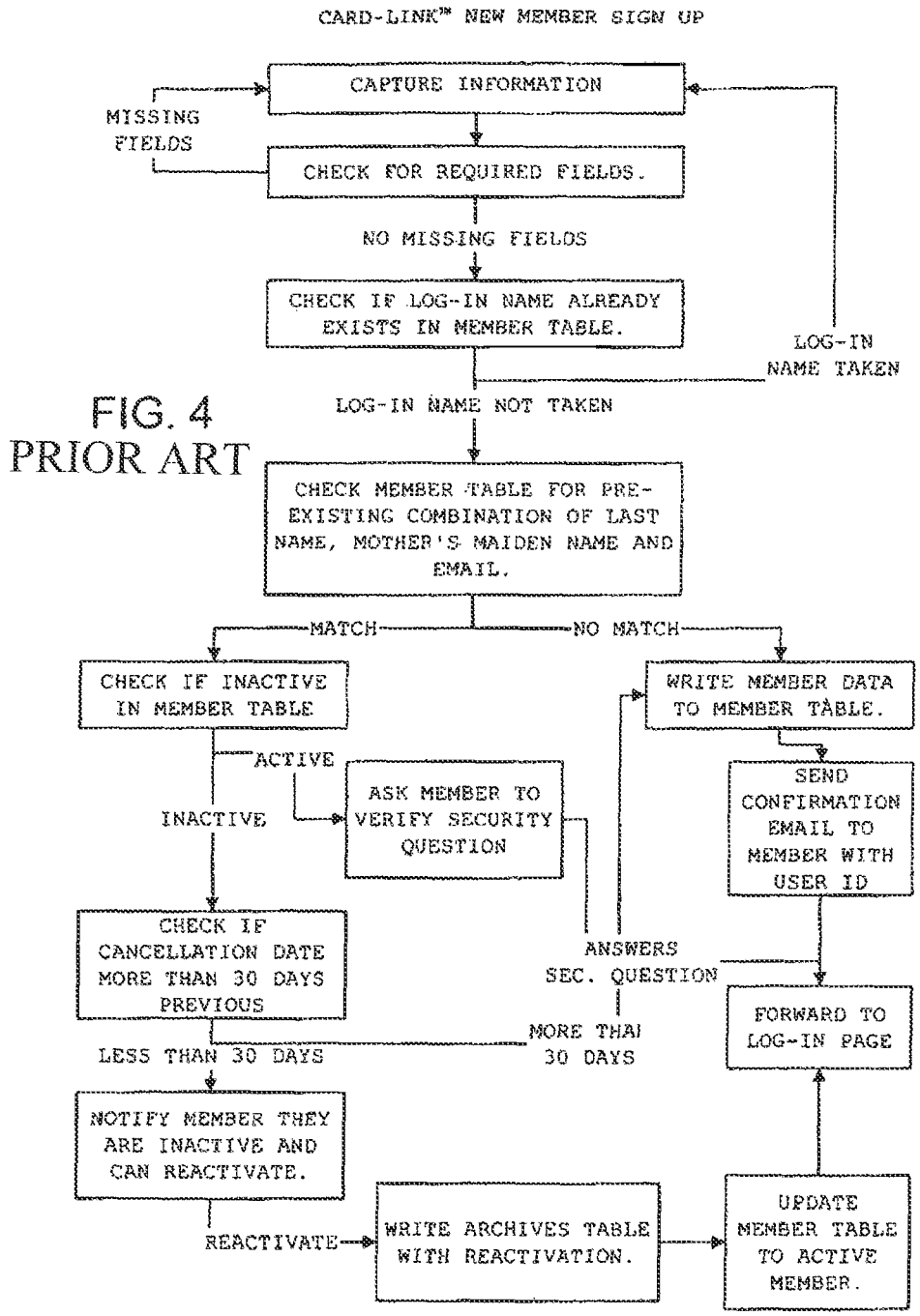
FIG. 4 present a flow chart of the computer program for "new member registration" services.

If the cardholder is not a member and wishes to register, the individual may "click" on the Register Option 56 and will pull up the Registration Screen as shown in FIG. 3. The computer program for the registration process is presented in the flow chart as illustrated in FIG. 4. The individual will be guided through the registration process and will be requested to provide the specified information in the flow chart. At the end of the process, the individual will be registered and have a personalized user identification and password. The individual can then return to the main menu screen (FIG. 2).

Upon return to the main menu screen (FIG. 2), the individual may want to learn more about the card management system by clicking on the Frequently Asked Questions Option 58. This will bring the individual to a screen wherein most frequently asked questions are presented with answer. Following are examples:

Q: Why should I register?
A: Managing a wallet full of cards is a major responsibility! Registering takes the hassle out of managing your cards. It's easy to maintain your card list on-line, and communication with a card issuer becomes almost effortless with the click of a mouse.

Q: Which cards may I register?
A: All of your cards! That includes credit and debit cards, ID cards, membership cards, insurance cards . . . virtually any card you carry in your wallet.

Q: Must I pre-register my cards?
A: No. Although it may be more convenient to pre-register your cards, you may register cards at the time service is requested.

Q: What if I register a card you have not heard of?
A: In that event, we will ask you for some basic details about the card issuer when the card is registered. Cards are our business, so we don't expect this to be a common occurrence.

Q: May I register cards of my spouse or other family members?
A: Certainly! A place is provided for you to enter an alternate cardholder name for any card registered.

Q: May I register business cards that go to a different address?
A: Yes. A place is provided for you to enter an alternate address for any card registered.

Q: If I have informed my card issuers directly of a loss or change of address, will they notify you?
A: No. Card issuers will not notify Card-Link of reports or changes you make directly with them.

Q: Will you keep a record of the different times I use your service?
A: Yes. We will keep an archive of your use of the service for a minimum of two years and you can view that service record at any time.

Q: Can my partner or spouse have their own membership?
A: Yes, but they will have to register as a separate member and pay their own fee as defined by your bank.

Q: How quickly will my cards be replaced after I have reported their loss?
A: The re-issue of cards is in the hands of the issuer and whilst they all take immediate notice of the loss reports, the speed at which they send out new cards will vary from 24 hours to 10 days.

Q: How can I get my lost cards replaced more quickly?
A: While we can report all your cards lost, we cannot influence the response of your card issuers. If you need a replacement in a hurry we suggest that, after having reported all your cards, you speak directly to the card issuer from whom you need the urgent card replacement.

Q: How secure is your website?
A: We take security of your data seriously. We use Secure Socket Layers (SSL, the industry standard) and the best software and hardware security solutions available today. All of your personal information—including name, address and card numbers—is encrypted so that information cannot be read as it travels over the Internet. Frankly, your information is more secure on our secure server than it is in a typical office environment.

Q: How do you ensure no one else has access to my information?
A: In addition to having state-of-the-art software and hardware to protect the data registered with us (see previous question), your file is password protected. You alone have control over your password, and can change it as often as you like.

Q: Is there any way I can know for sure my information is encrypted?
A: Your browser will tell you. Both Netscape and Internet Explorer browsers display an icon at the bottom of the screen indicating that you are at a secure site.

Q: How do you notify card issuers?
A: Card issuers are notified via e-mail, fax, telex, phone or letter. Many times one method is preferred by a particular card issuer.

Q: What is the liability for fraudulent use of a credit card?
A: Liability is limited under the Consumer Credit Act to $50. This limit does not apply if the cardholder acts fraudulently or with gross negligence, including disclosure of the cardholder's PIN number.

Figure 6:
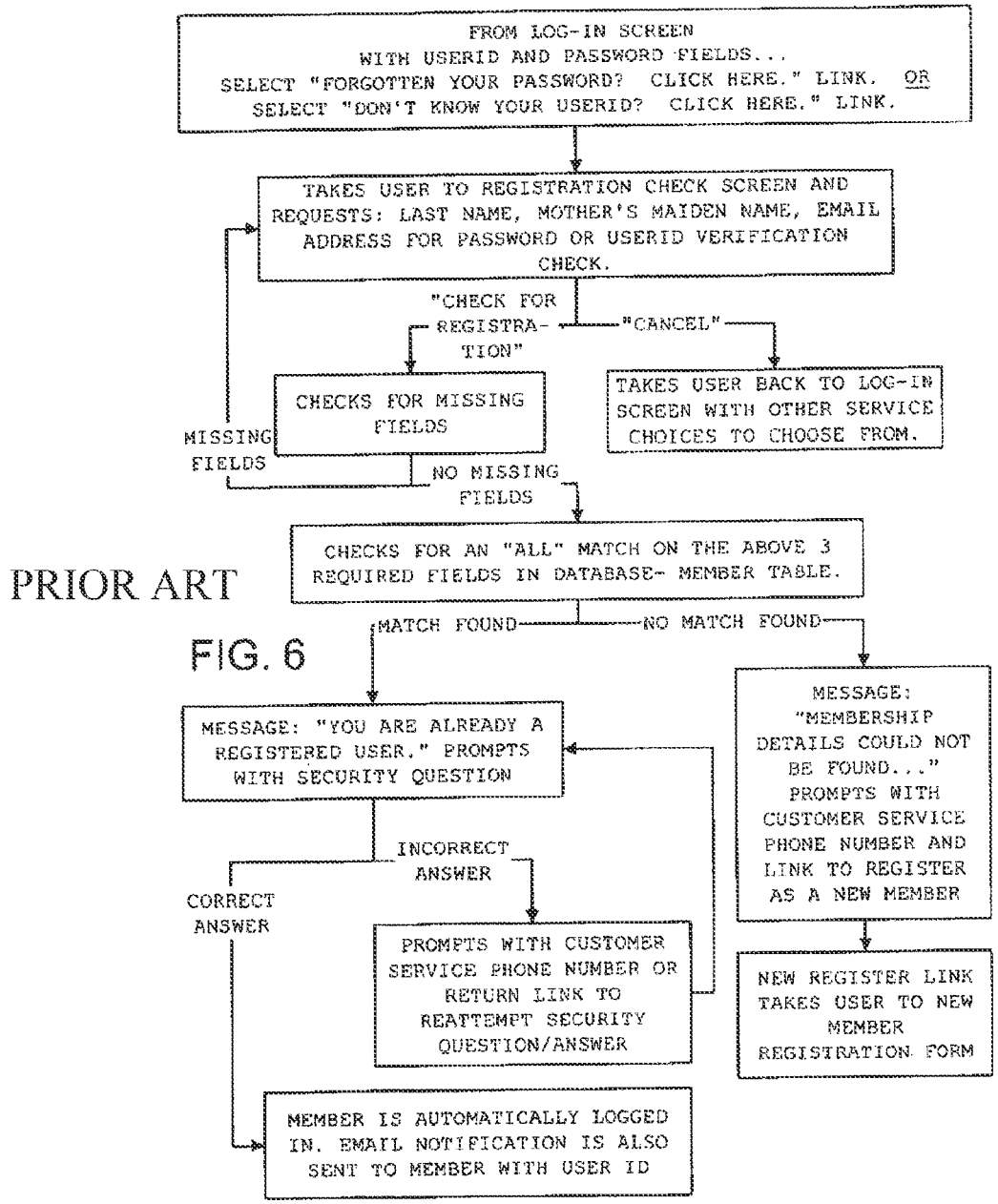
FIG. 6 present a flow chart of the computer program for "user identification and password check" service"

If the individual is not sure he is a registered member, he or she can click on Log In Assistance 54 in FIG. 2, which will bring a separate screen shown in FIG. 5 and will be guided through a check procedure as set forth in the flow chart in FIG. 6. Note that, if at the end of the process the individual is found to already be a member, he or she is brought back to the Main menu (FIG. 2). Upon clicking on the Log in Option 52, the individual will learn whether he or she is already logged in. If not found to be registered, the individual is brought to the Registration Screen (FIG. 3).

Figure 7:
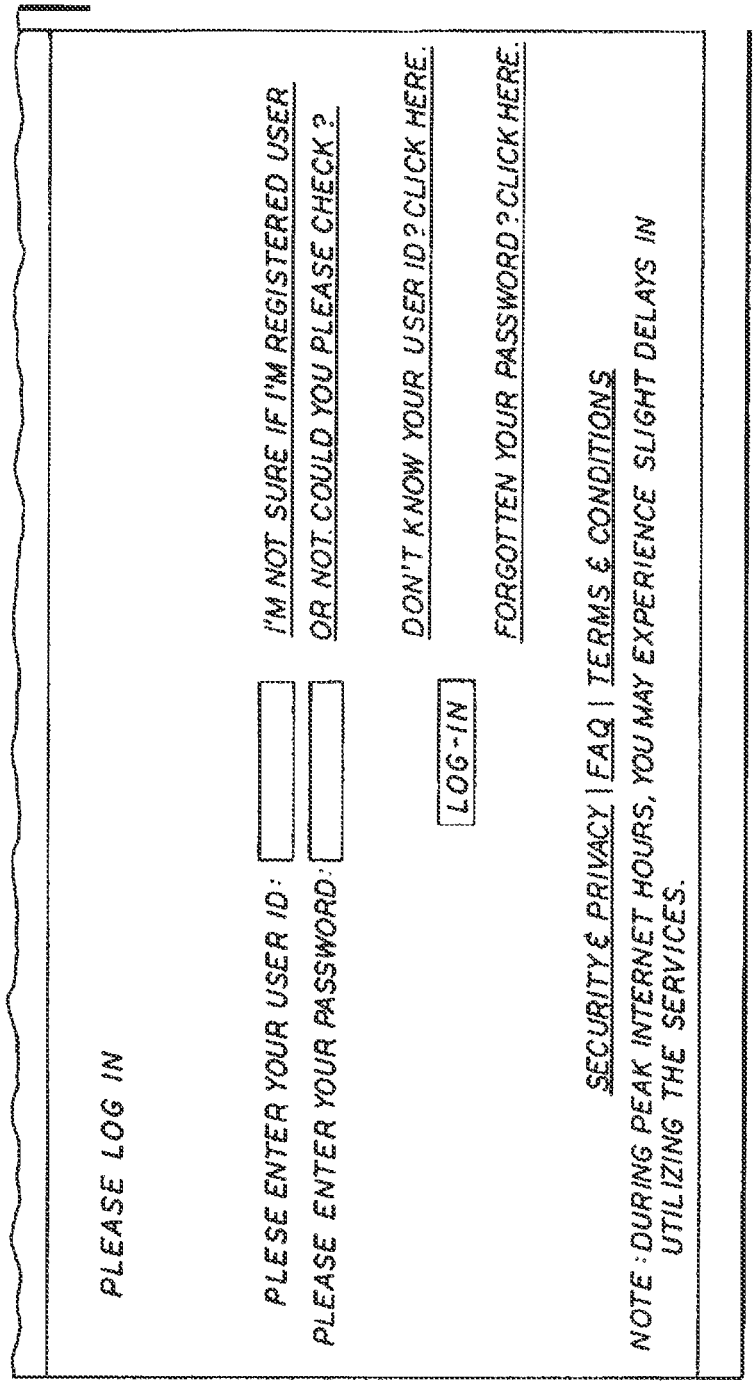
FIG. 7 is a simplified view of the "logging in" screen.
Figure 9:
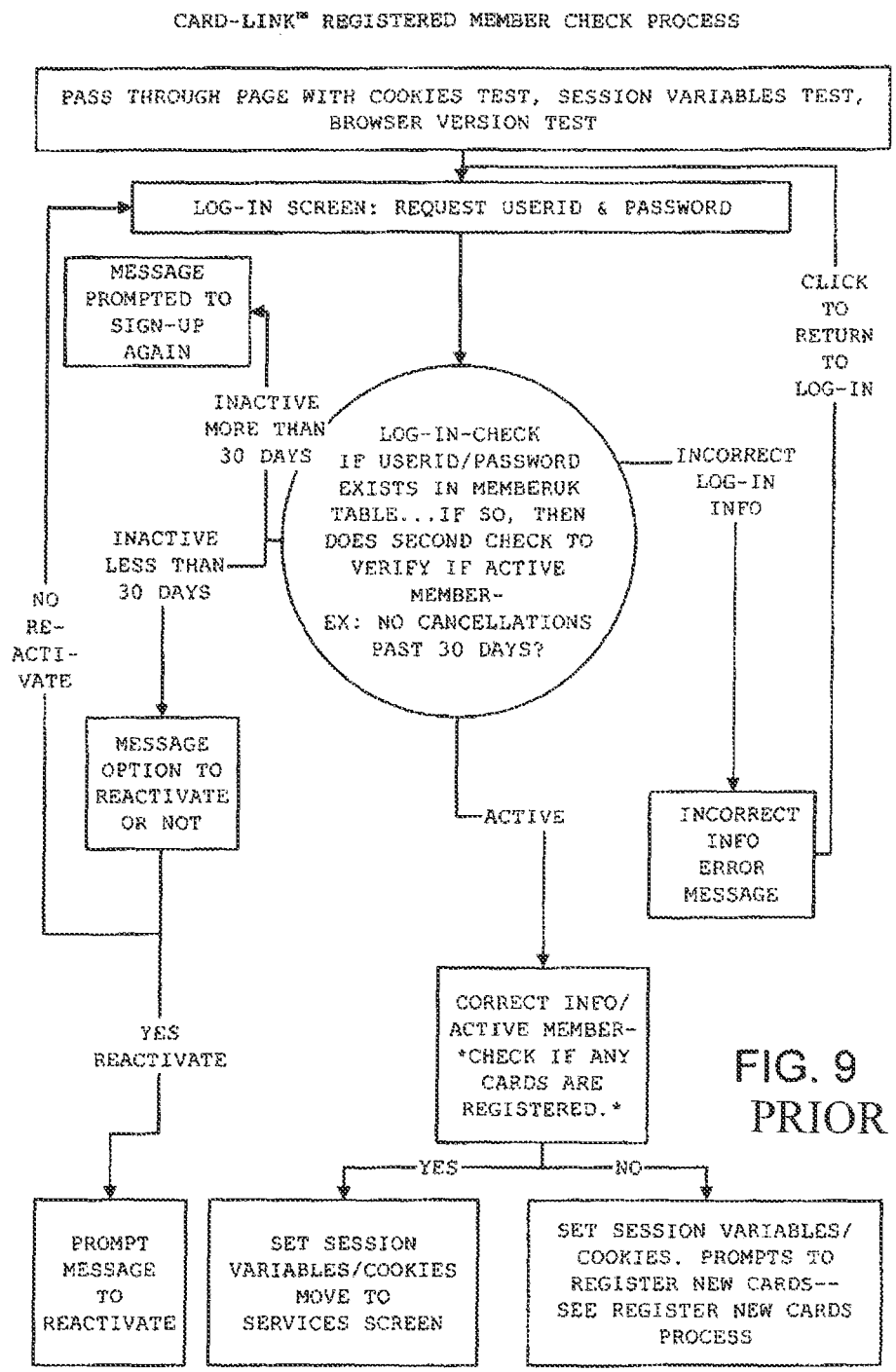
FIG. 9 present a flow chart of the computer program for "check-in."

If the individual is already a member or has just become a member and knows the pin number, the individual can click on the Log In Option 52 (FIG. 2) which will bring up the Log in screen as shown in FIG. 7. Upon logging in, the Member Services menu as illustrated in FIG. 8 will appear. This allows the individual to access the services offered:

Report Lost/Stolen Card(s)
Address Change
Request New/Replacement Card(s)
Charge Dispute
Request Copy of Statement
Report Change of Marital Status/Name
Request Increased Credit Limit All these steps are illustrated in the computer flow chart illustrated in FIG. 9.

Figure 11:
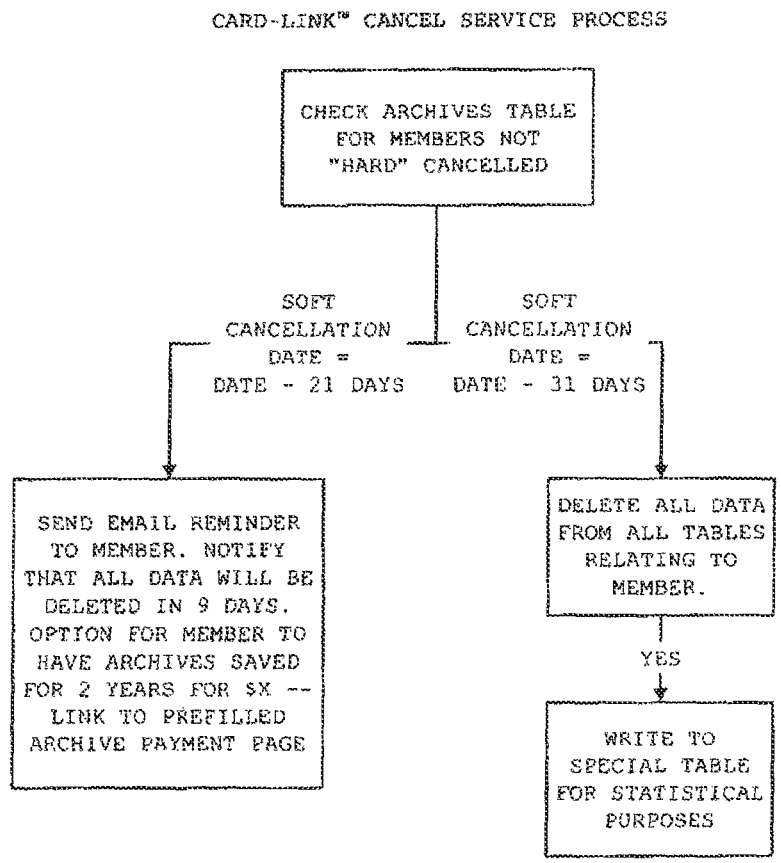
FIG. 11 is a flow chart for the computer program to "cancel services."
Figure 13:
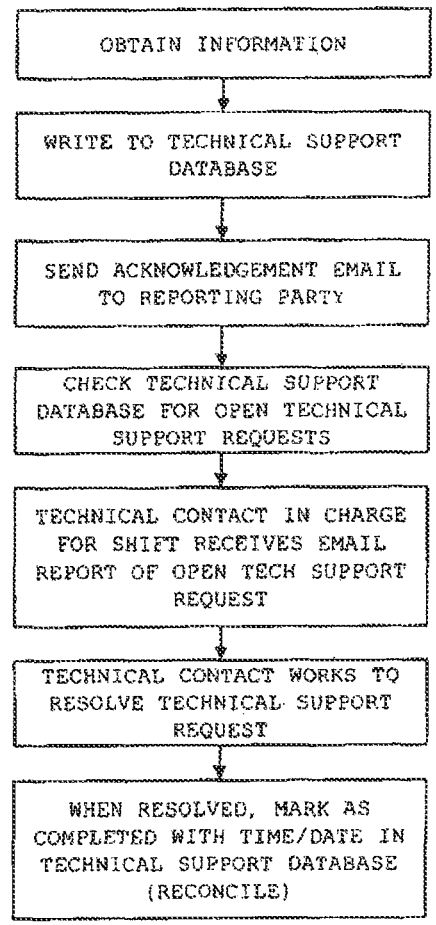
FIG. 13 is a flow chart of the computer program for "obtaining technical support" services.
Figure 14:
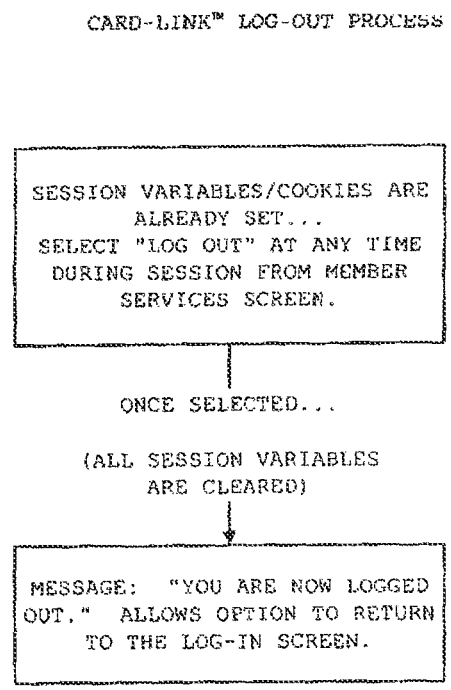
FIG. 14 is a flow chart of the computer program for "logging out."

The Member Services menu further includes an option to cancel the service and the program as disclosed in FIG. 10 with the associated computer flow chart illustrated in FIG. 11. Note that confirmation is provided. The Member Services menu also includes an option to contact Technical Support as indicated in Technical Support menu (FIG. 12) and the computer flow chart as illustrated in FIG. 13. The individual is provided with capability to indicate the type of problem and provide details thereof. The provider can then analyze the problem and correct it and contacts the individual by e-mail. Of course, a Log out Option is provided and is illustrated in the computer flow chart provided in FIG. 14.

Figure 15:
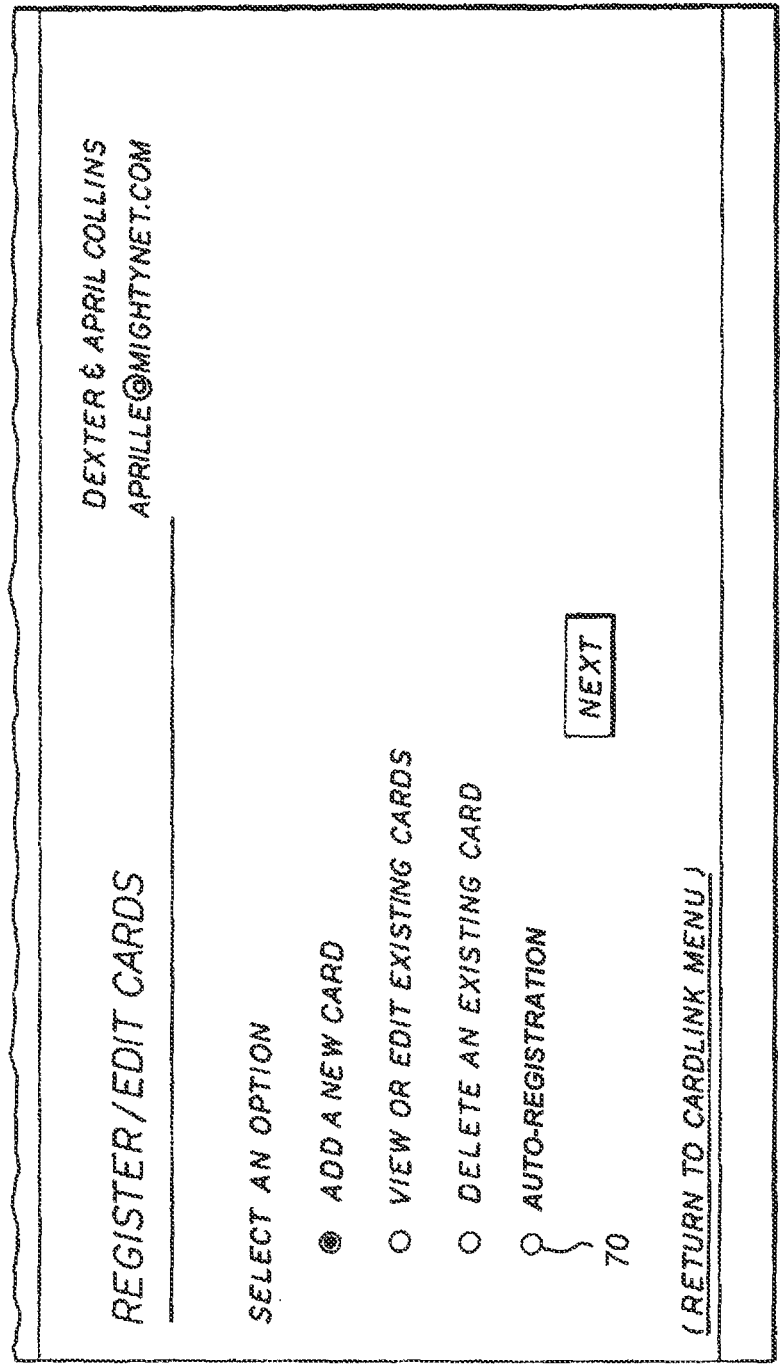
FIG. 15 is a view of the screen for "manually registering/editing/automatic registering cards."
Figure 16:
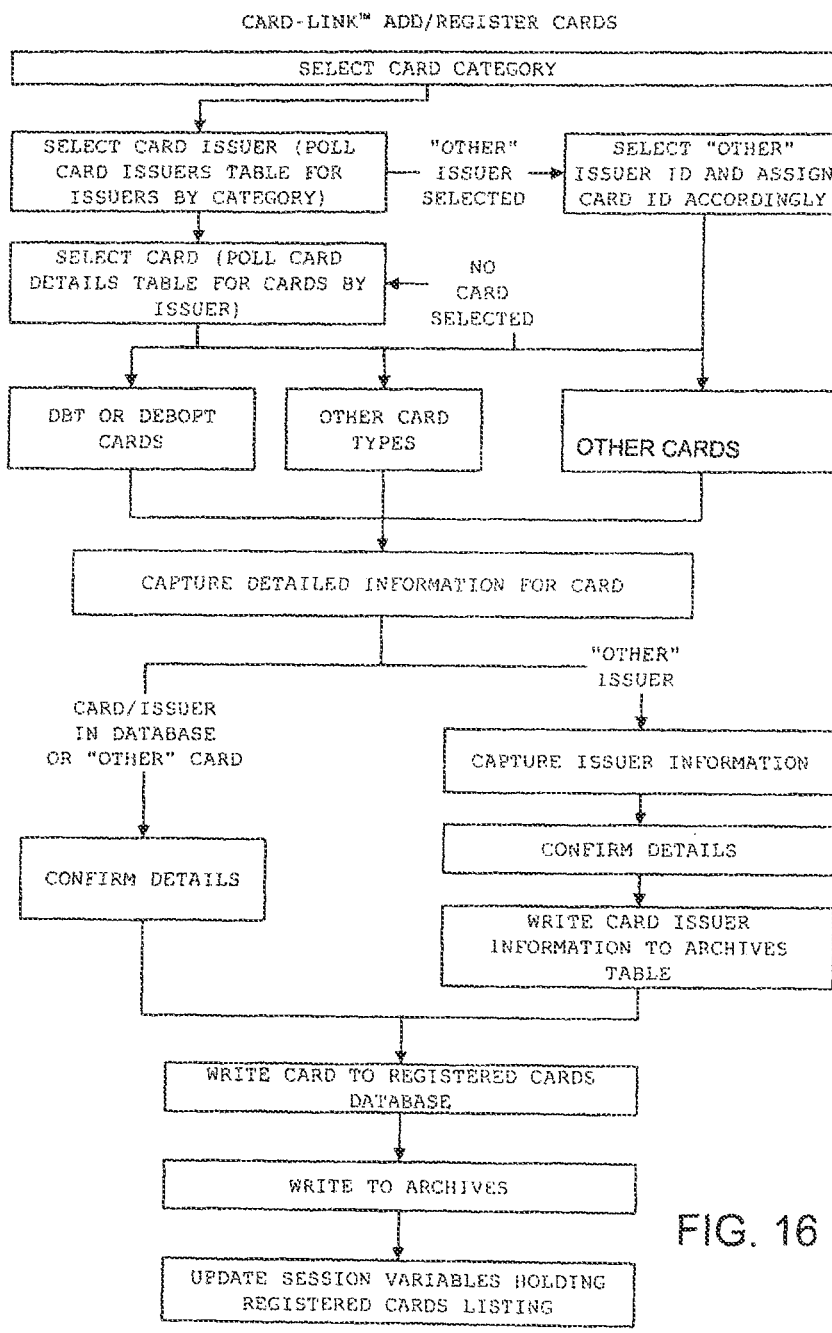
FIG. 16 is a flow chart for a computer program for "adding and registering cards" services.
Figure 17:
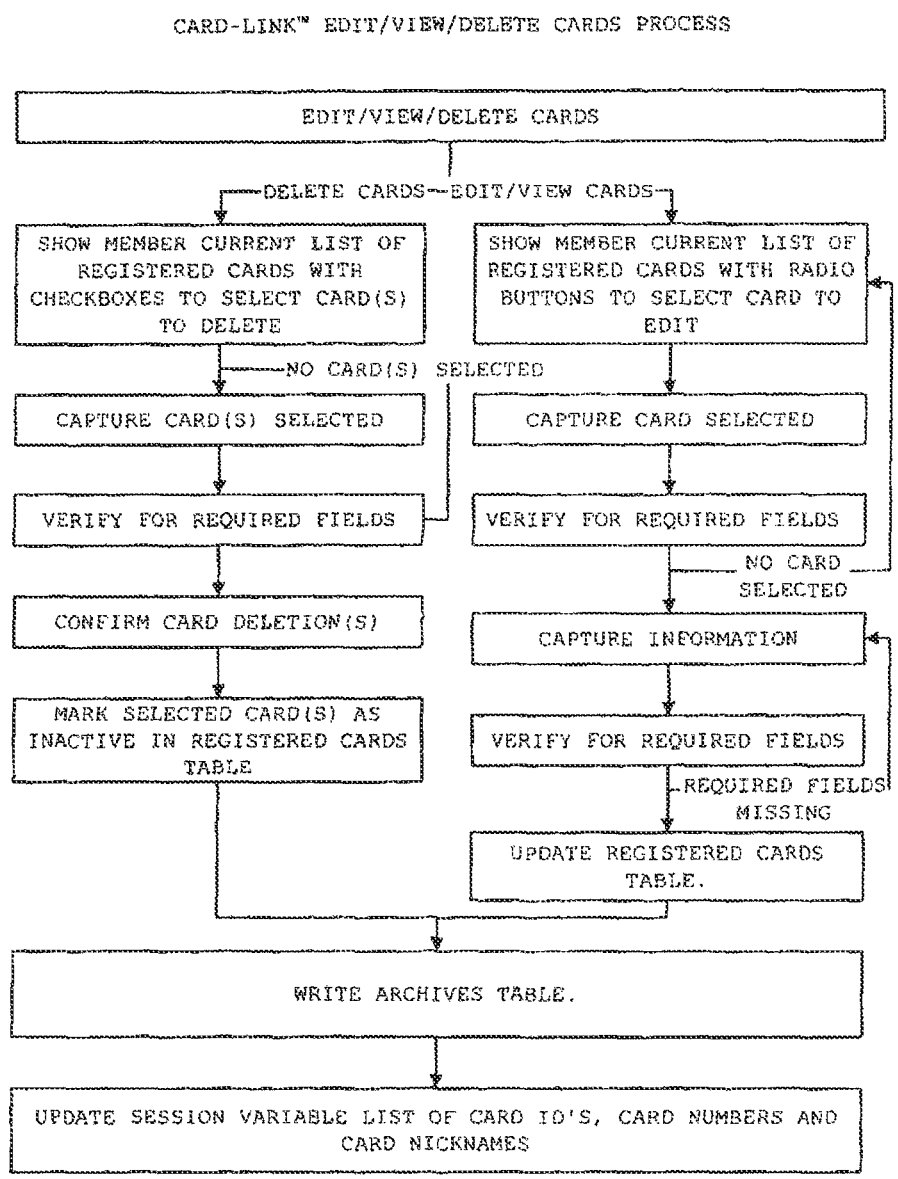
FIG. 17 is a flow chart for a computer program for "editing and viewing and deleting cards" services.
Figure 18:
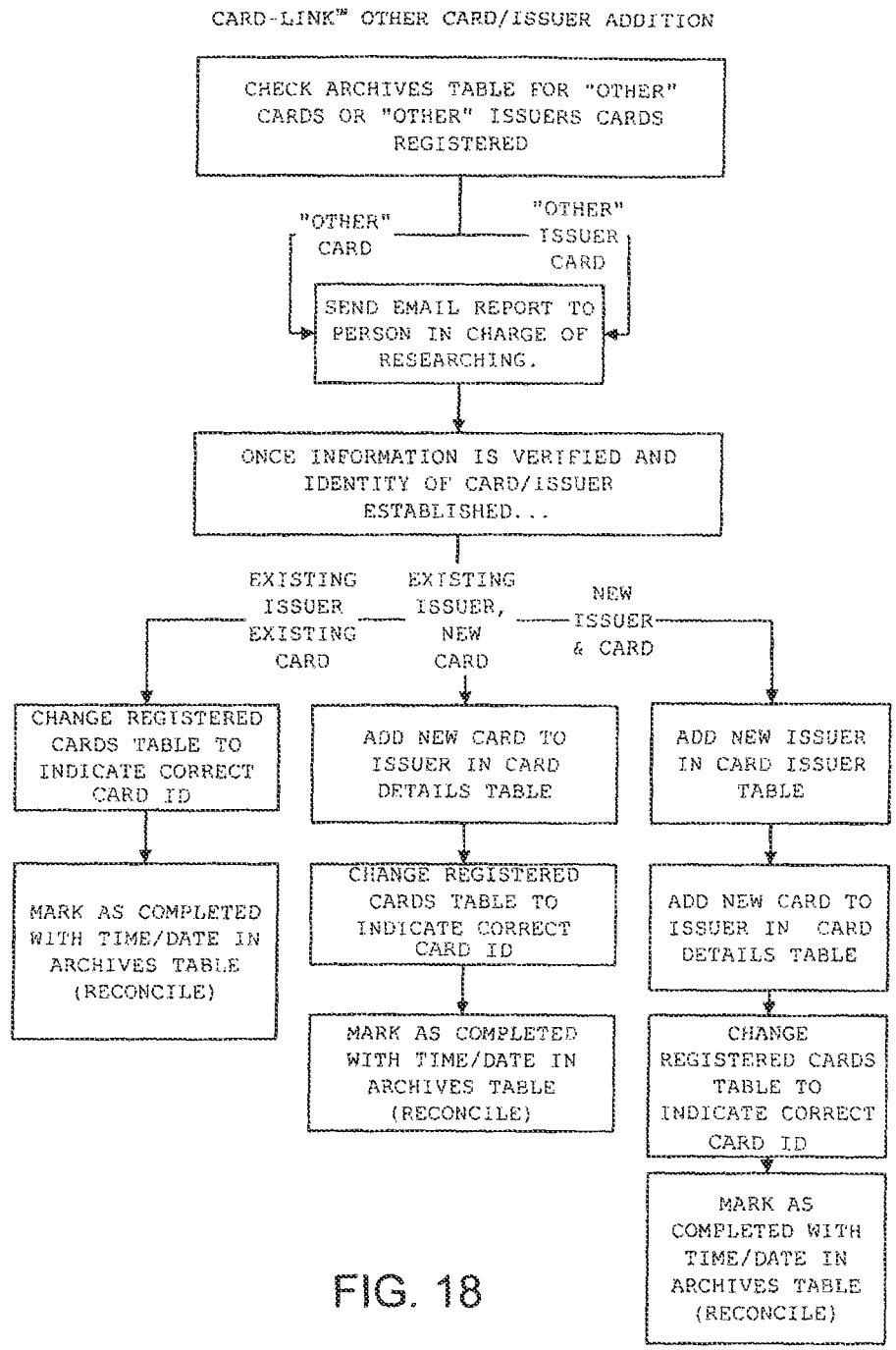
FIG. 18 is a flow chart for a computer program for "adding cards from unlisted issuers" services.

Still referring to the Member Services menu in FIG. 8 and additionally, to the Register/Edit Cards menu in FIG. 15, the flow chart for the computer program to add/register cards is illustrated in FIG. 16, while the edit/view/delete computer flow chart is illustrated in FIG. 17. Thus new cards can be added, the existing cards can be viewed and edited, and cards can be deleted. The individual is prompted to select a category of card to be added: bank, retail, membership or other. The individual is then prompted to select the card issuer from a list of cards within the program directory, or enter the name if the card is not found on the list. If issuer or card is not known, the individual will be prompted to provide issuer or card details, such as the card number, account number and sort code, etc. The individual is also prompted to enter an alternate name for the card chosen, if desired, as well as alternate billing information, if applicable. To delete cards, the individual is presented with a list of previously registered cards, and prompted to select the card(s) to be deleted. For convenience, a list is provided of the most prominent issuers and cards. If not in the list in the program directory, the individual may enter information relevant to the new card (noted as "other cards" in the flow chart in FIG. 18).

Figure 20:
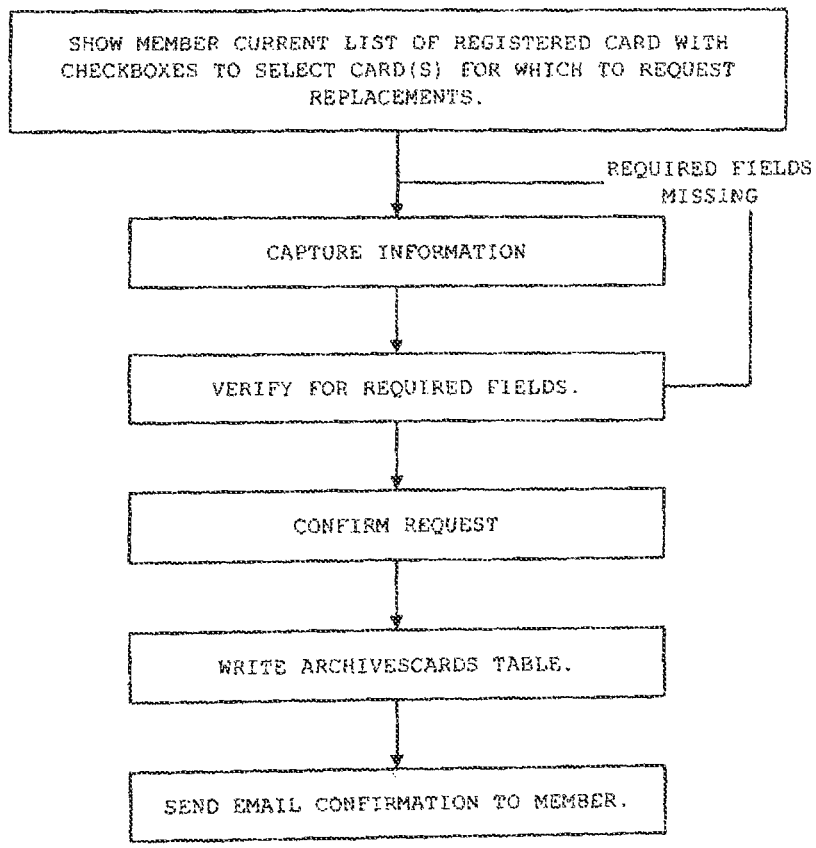
FIG. 20 is a flow chart for the computer program for "requesting new or replacement card that is already registered" services.

Referring to FIG. 8 and additionally to FIG. 19, which is the Request New/Replacement Option menu screen for cards that are listed on the menu and to FIG. 20, which is flow chart of a computer program therefore, reasons for requesting the new/replacement cards can be entered, as well as the name of the individual that should appear on the card. Confirmation is provided to the individual card user.

Still referring to FIG. 8 and to FIG. 21, which is the Lost Report Option menu, and additionally to the flow charts for the computer program illustrated in FIGS. 22 to 27, after selecting the reporting option on the Member Services menu screen, the Reporting Option menu screen, FIG. 21, appears. The individual is prompted to select the card(s) that are missing, after first adding any missing cards to the list of registered cards. In subsequent screens, the individual is also prompted to provide details concerning the loss, then submits a lost report. Details include:

Whether the cards are lost or stolen;
Where the loss occurred;
Date loss occurred (or date user discovered cards missing);
Temporary phone numbers where user can be reached during next 48 hours;
Police report number, if any;
Notes about loss; and
Whether or not replacement cards are required.

Figure 22:
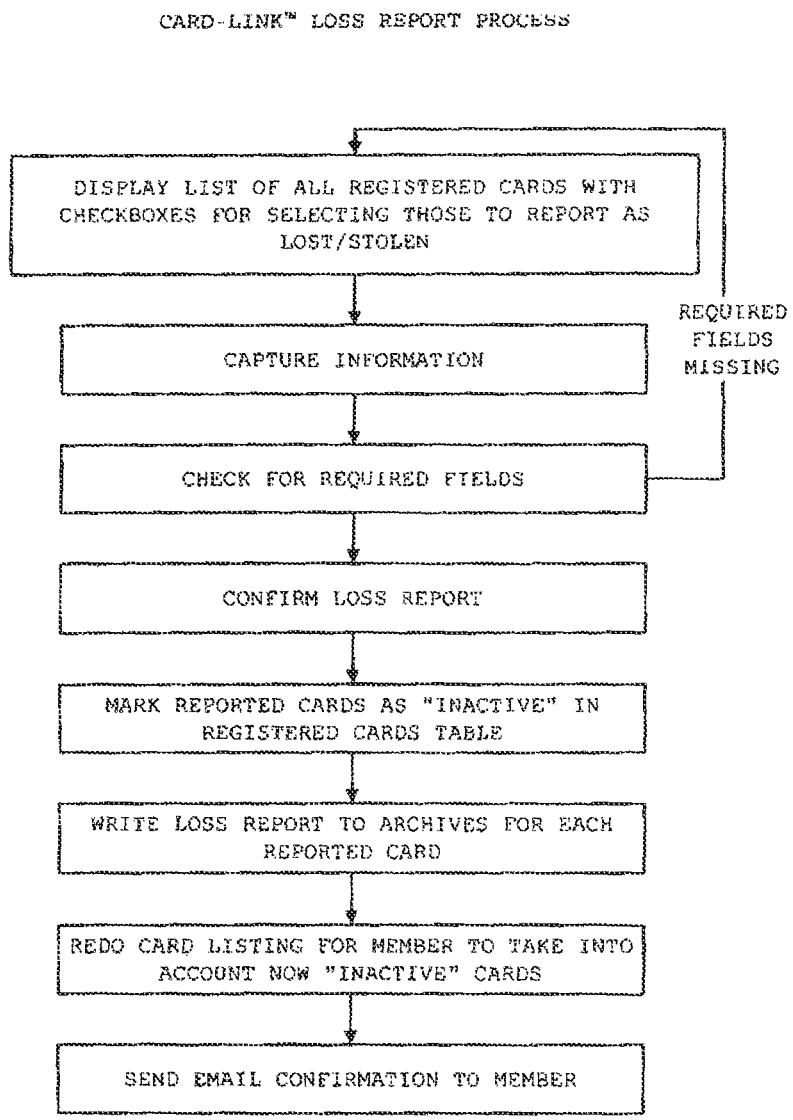
FIG. 22 is a flow chart for a computer program for "reporting lost cards" services.
Figure 23:
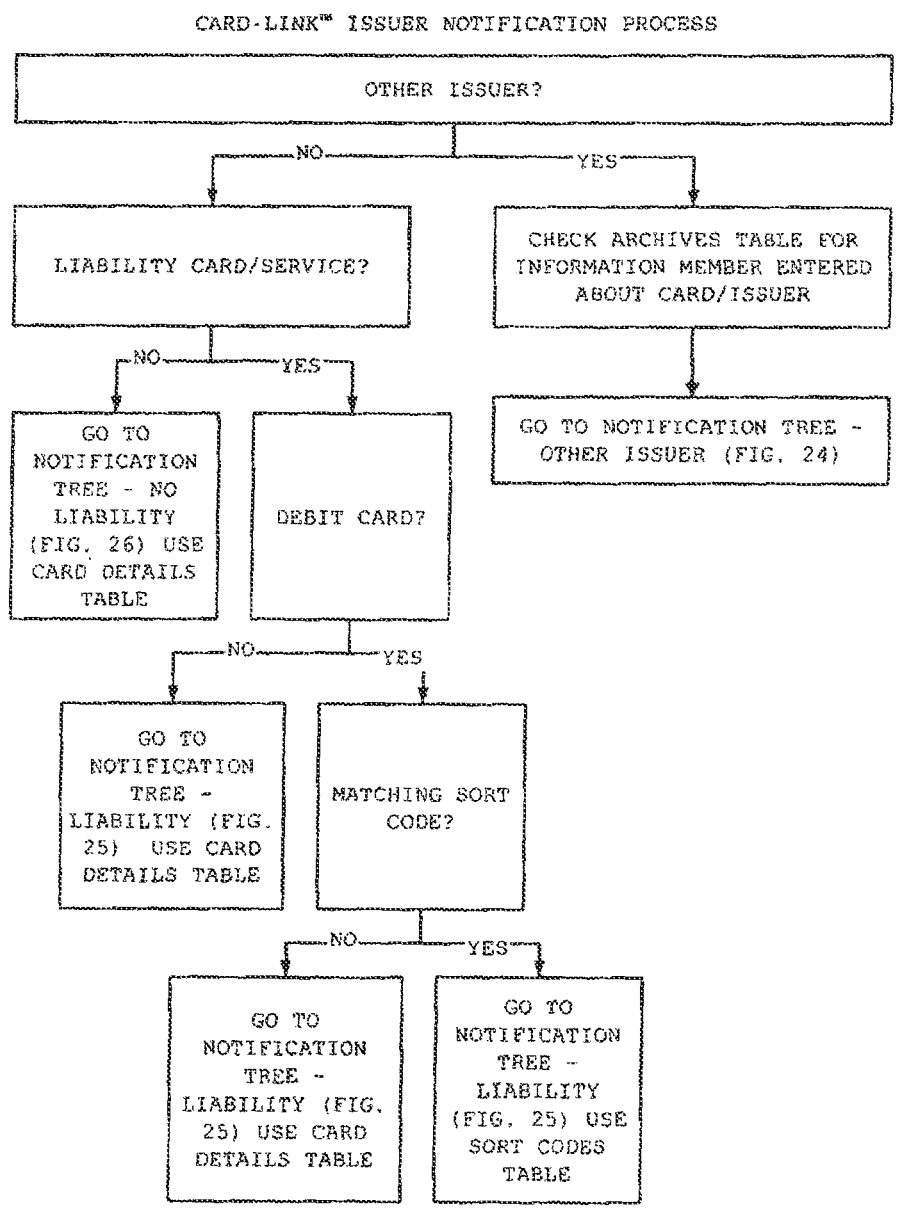
FIG. 23 is the flow chart for a computer program for "reporting lost cards to the card issuer.

The flow chart presented in FIG. 22 covers a computer program for recording and initial processing of the card holder report, with confirmation back to the individual. FIGS. 23-27 are flowcharts that determine how the card issuer is to be notified. If the card issuer is in the program directory, a determination is made as to whether the card user has liability (such as a credit card with can be fraudulently used). If there is no liability, the program moves to the flowchart in FIG. 26 and if liability attaches then the program moves to the flowchart in FIG. 25. In both cases all avenues of communication with the card issuer will be tried. If all attempts are unsuccessful, then an exception report (FIG. 27) is prepared for the Card Service Organization to "manually" handle.

Figure 24:
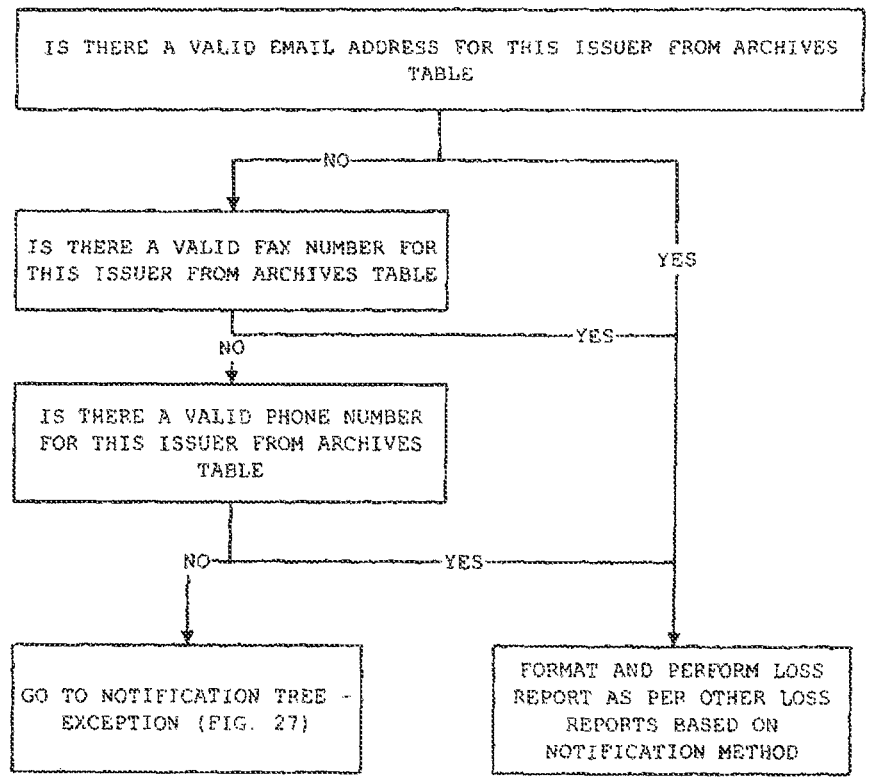
FIG. 24 is a continuation of the flow chart illustrated in FIG. 23.
Figure 25:
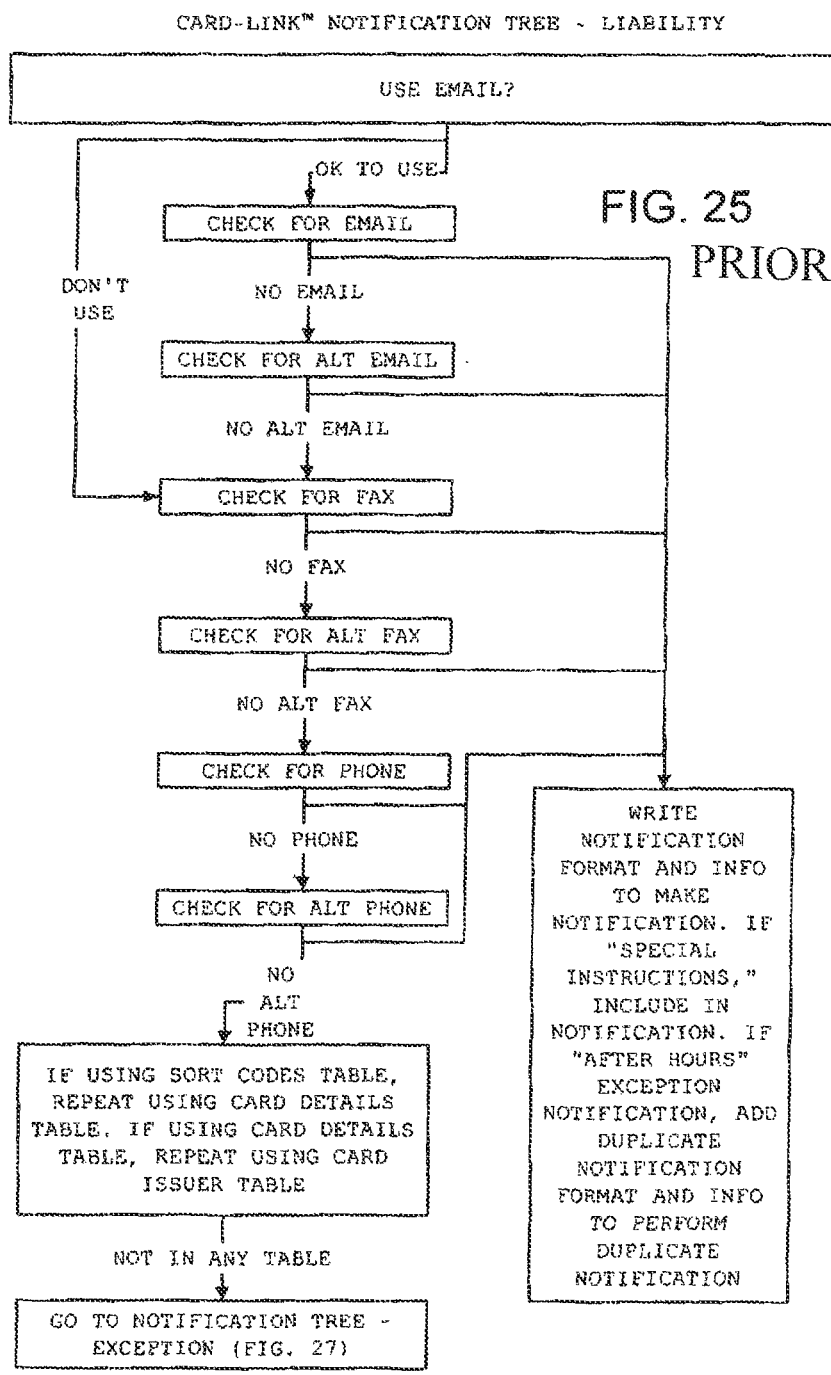
FIG. 25 is a continuation of the flow chart illustrated in FIG. 23.
Figure 26:
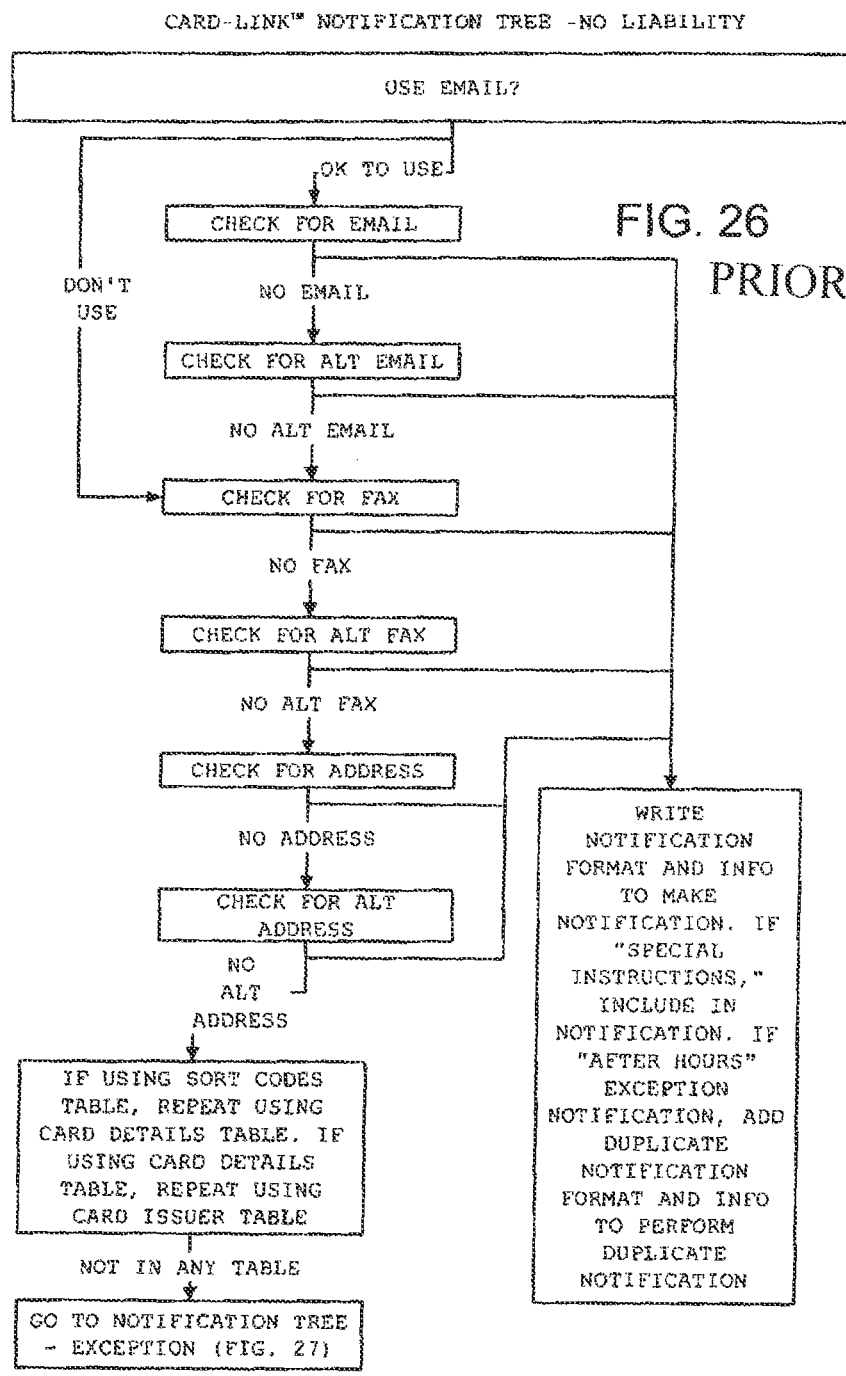
FIG. 26 is a continuation of the flow chart illustrated in FIG. 23.
Figure 27:
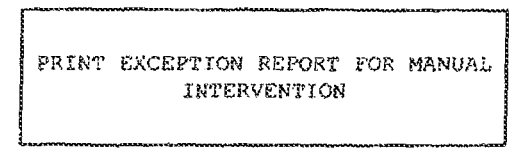
FIG. 27 is a continuation of the flow chart illustrated in FIG. 23.
Figure 28:
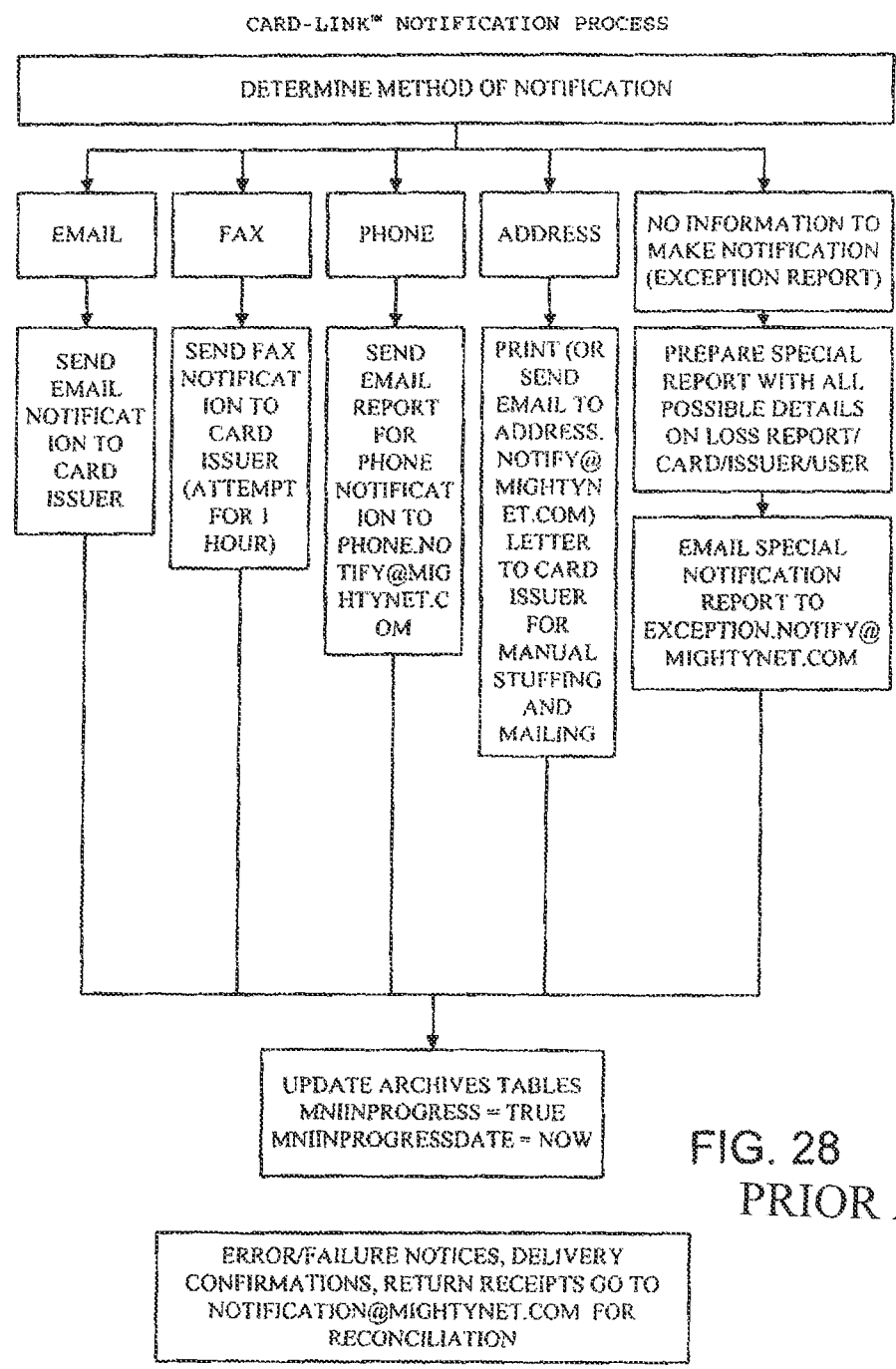
FIG. 28 is a flow chart of the card management organization "monitoring procedure for insuring lost cards are reported to the issuer."

Referring back to FIG. 23, if the card is from an "other issue", or in other words not in the program directory, then the program transfers to the program set forth in the flowchart in FIG. 24. Again, if automated contact can not be made, then an exception report (FIG. 27) is prepared for the Card Service Organization to "manually" handle. In FIG. 28, a flow chart is presented wherein the Card Management Organization personnel can monitor the progress of the reporting lost cards to the card issuer.

In all cases, the individual receives an e-mail confirmation, and periodic e-mail reminders to update their card list. In addition, the service is archived for a minimum of two years.

Figure 30:
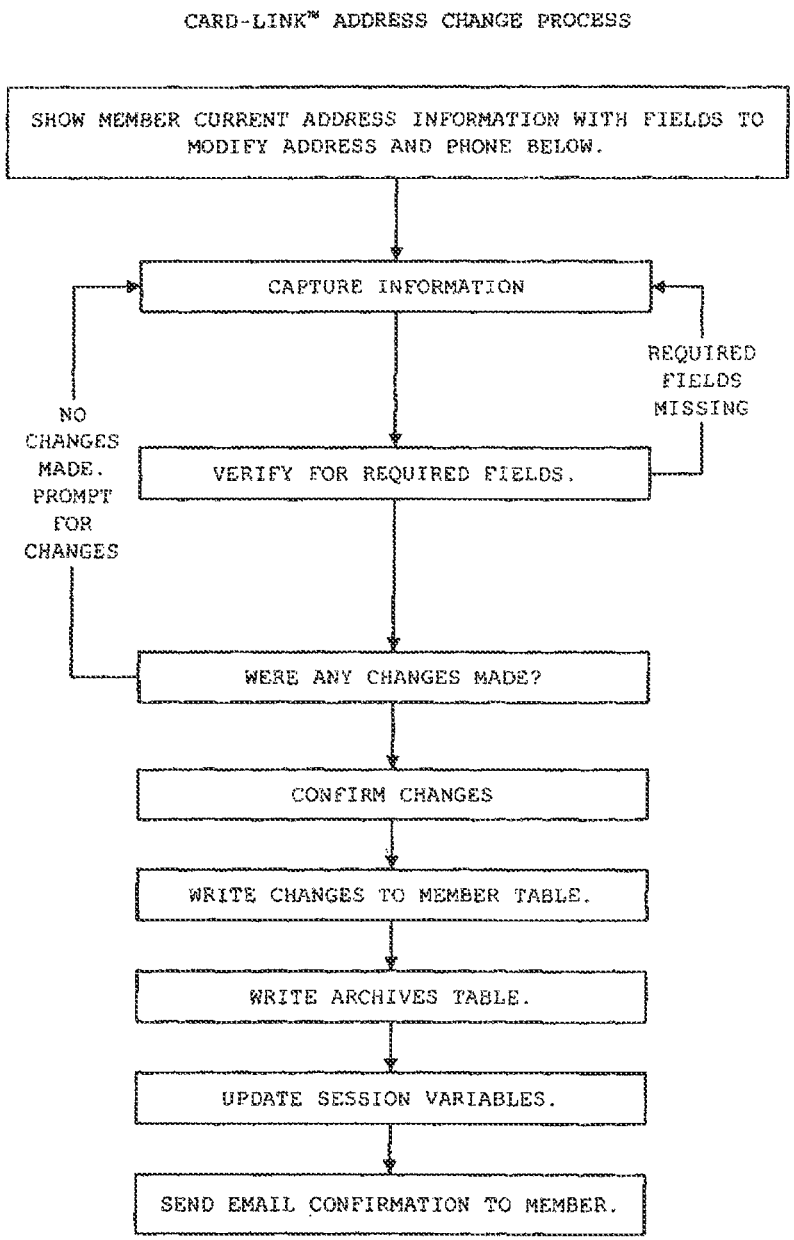
FIG. 30 is a flow chart for a computer program for "making an address change" services.

Referring to FIG. 8 and to FIG. 29, which discloses a Change of Address Menu screen and FIG. 30, which is the flow chart for the computer program to achieve a change of address, the individual is prompted to provide the new address, and indicate if all issuers are to be notified. Notification is made via e-mail, fax or letter, if applicable. The individual receives an e-mail confirmation and periodic e-mail reminders to update the card list. The service is archived for a minimum of two years.

Figure 32:
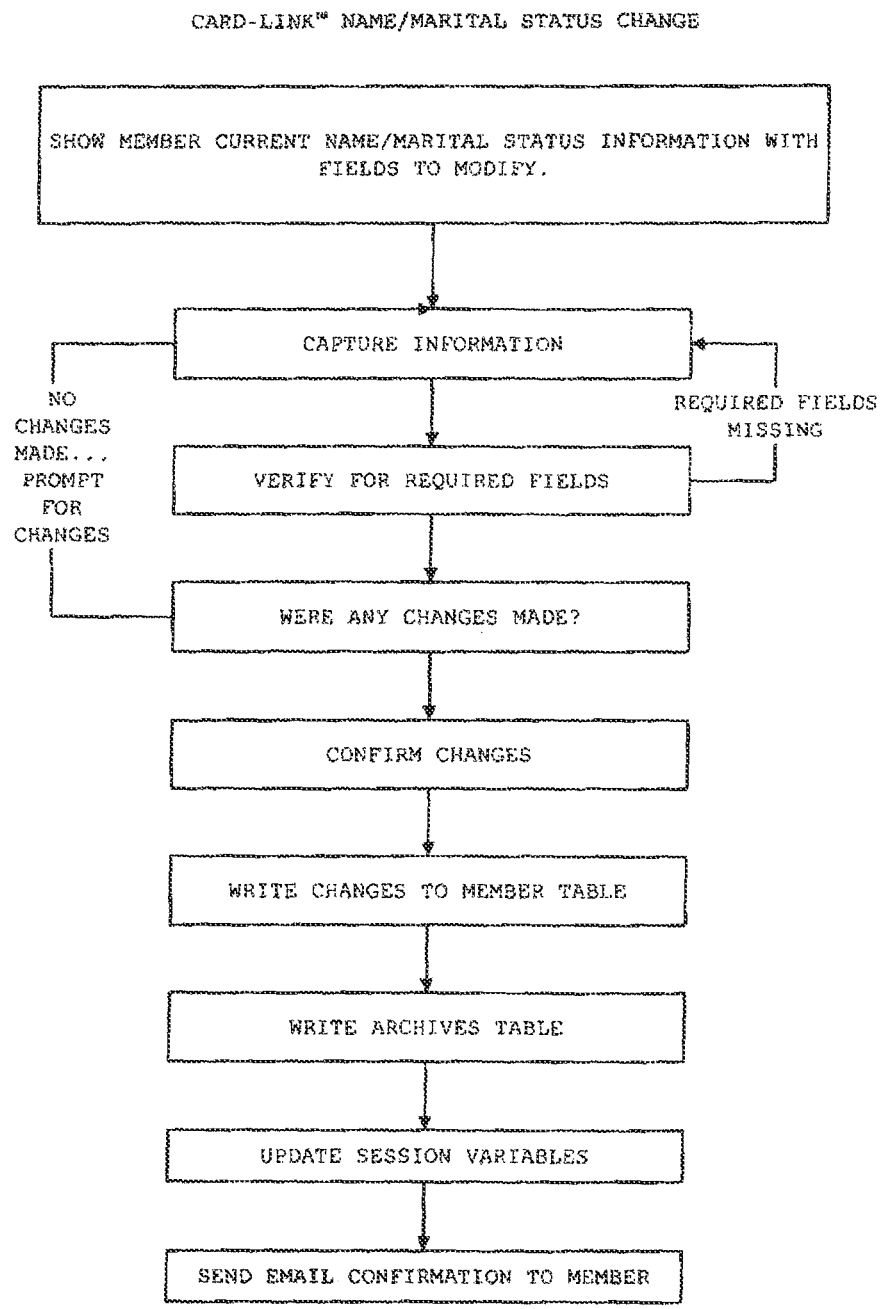
FIG. 32 is the flow chart for a computer program for making a "name or marital status change" services.

The individual user can request a name change or change in marital status. Again referring to FIG. 8 and, additionally to FIG. 31 which is a screen that prompts the individual to select the change and FIG. 32 which is the flow chart for the computer program thereto, the individual can indicate the changes and can provide details. Notifications are made via e-mail, fax or letter and the individual receives an e-mail confirmation and periodic e-mail reminders to update card list. The service is archived for a minimum of two years.

The individual user can request that a card issuer increase the credit amount. Again referring to FIG. 8 and, additionally to FIG. 33, which is a screen for prompting the individual to select the card and FIG. 34, the flow chart for the computer program thereto, the individual is prompted to select the card for which a credit increase is desired. Notifications are made via e-mail, fax or letter and the individual receives an e-mail confirmation and periodic e-mail reminders to update card list. The service is archived for a minimum of two years.

Figure 34:
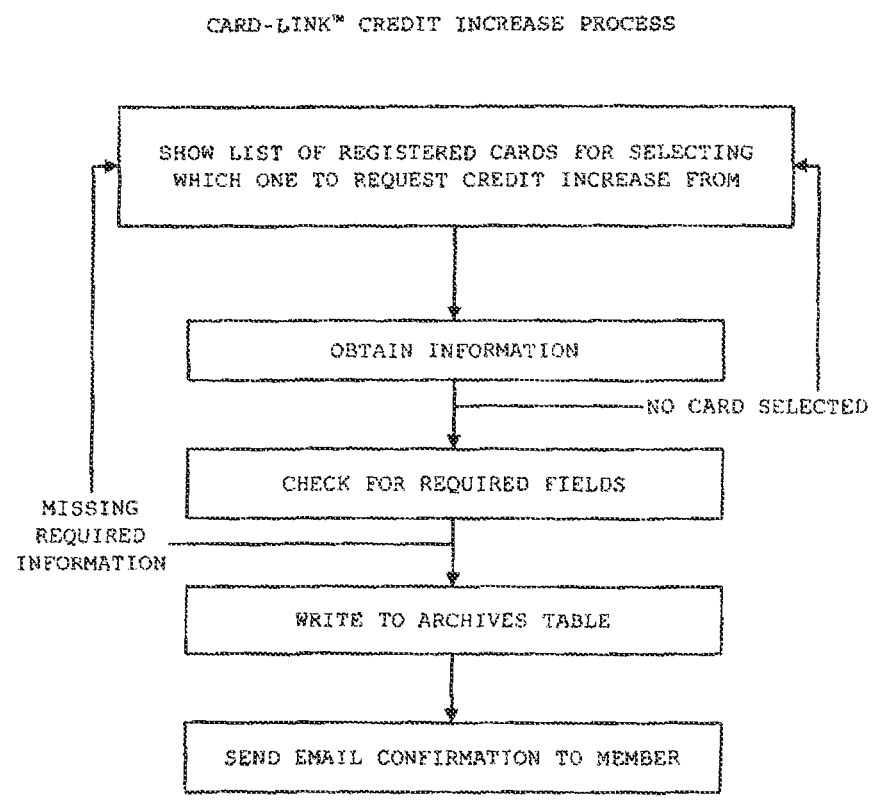
FIG. 34 is the flow chart for a computer program for "requesting a credit increase" services.

From the Member services menu (FIG. 8) the individual user can notify the card issuer of a credit card charge dispute. Referring to FIG. 34, which is a screen that allows the individual to select the card, and to FIG. 35, which is a flow chart for the associated computer program thereto, the individual selects the card whose billing is in dispute and provides information on the particular charge in dispute. The card issuer is notified and the individual is informed by e-mail when the card issuer is notified. The service is archived for a minimum of two years.

Figure 37:
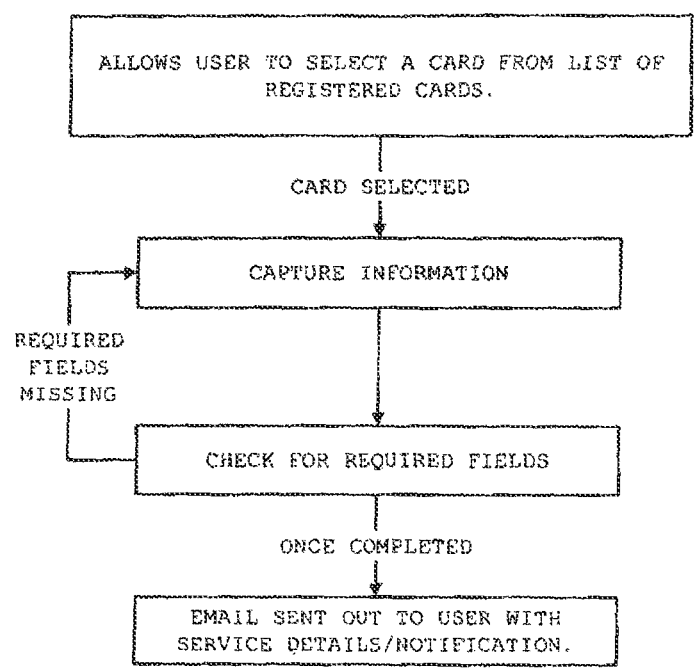
FIG. 37 is the flow chart for a computer program for "reporting a charge dispute made on a credit card" and "ordering a copy of a statement" services.

Still referring to FIG. 8, the individual can bring up a record of all transactions over any given period of time up to two years and request a copy thereof. The screen is illustrated in FIG. 36 while the flow chart for the associated computer program is provided in FIG. 37.

In accordance with a further aspect of the present invention, the card management system includes a telephonic user interface, which allows a user to communicate with the card management system via telephone 62 rather than via the computer network. In a preferred alternative embodiment, the telephonic user interface includes a conventional voice recognition/response system 63, as illustrated in FIG. 1. The telephonic user interface allows a user to use their voice and/or telephone keypad to select card management services and input data to the card management system. Instructions and confirmation information is output aurally to the user through the telephone speaker. All of the services accessible via the computer network are also accessible via the telephonic user interface. This allows a user to use the card management system when access to the computer network is unavailable or inconvenient (e.g., when traveling without a laptop computer).

While the above invention disclosed in U.S. patent application Ser. No. 09/846,616 entitled Card Management System and Method Therefore by S. Kasower, filed May 1, 2001, provides complete card management services, it required that the individual user manually enter all the credit card information, i.e., credit card number, card issuer organization, etc. The purpose of the subject invention is to provide for automatic entering of the necessary credit card information. After registering as a member by the process described above, the Register/Edit Cards Screen, illustrated in FIG. 15, is brought up and the individual user can click on Auto Registration Of Cards button, indicated by numeral 70. This will start a process wherein the individual user's cards are automatically registered.

Figure 38:
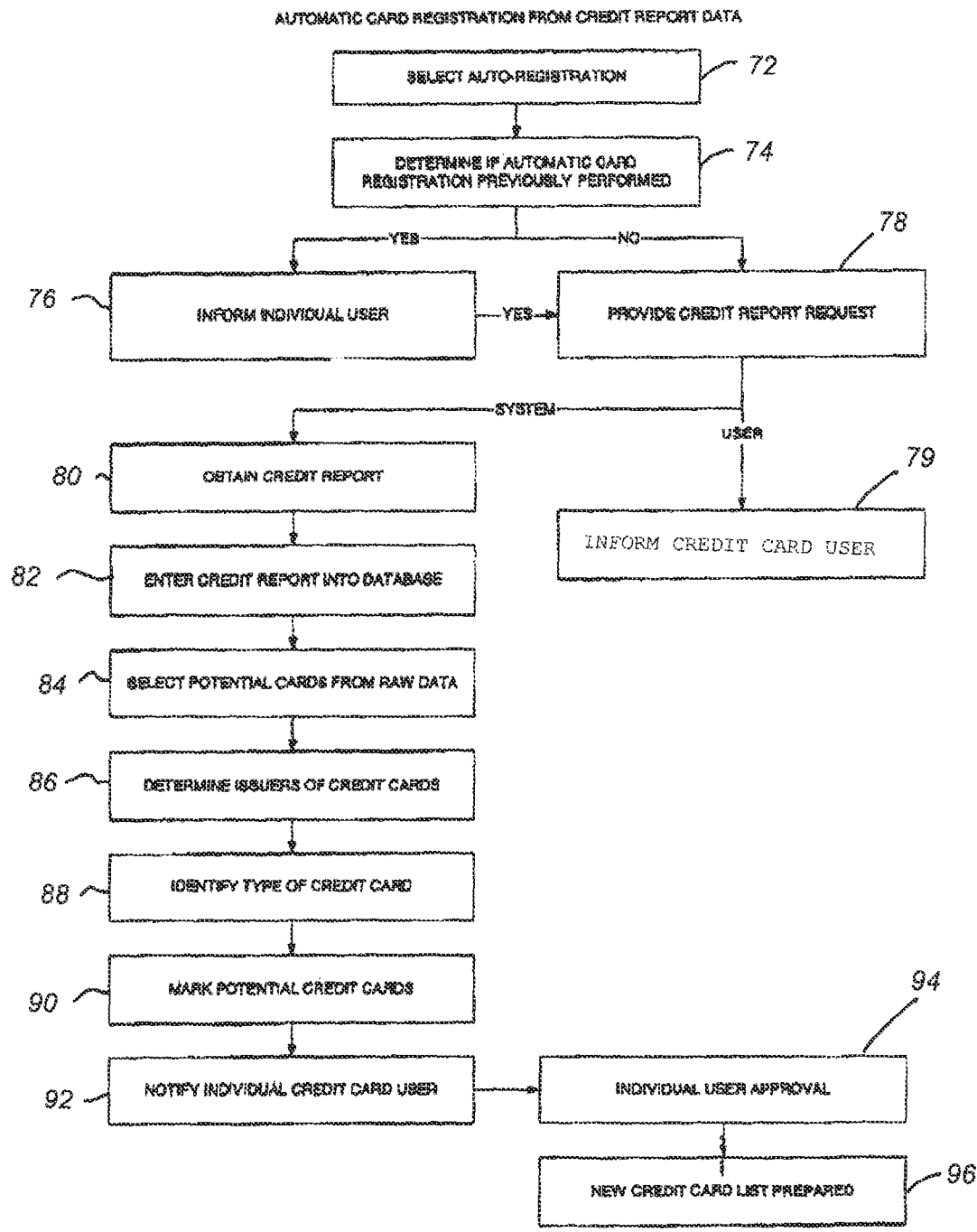
FIG. 38 is a flow chart of the method of automatically registering credit cards with the card management system.

Referring now to FIG. 38, the method involves the following steps.

Step 72—Select Auto-Registration. Selecting Button 70 on the Register/Edit Screen (FIG. 15).

Step 74—Determine if Automatic Card Registration Previously Performed. For example, if the individual user has previously requested Automatic Card Registration with the last few days, there is probably no reason to again request such action so soon. Thus the screen illustrated in FIG. 39 appears. If the individual user selects NO, the process continues to Step 78. If YES, it continues to Step 76.

Step 76—Inform Individual User. At this point the screen as illustrated in FIG. 40 appears. If the user does not wish to continue, he or she selects NO and the process ends. If YES is selected, the program continues to Step 78.

Step 78—Provide Credit Report Request. A screen, FIG. 41, will appear, which the user will fill out in order to allow the credit card management organization to obtain the credit report.

Step 79—Inform Credit Card User. The individual credit card user is then informed that he or she will be informed by e-mail within a specified time, typically 15 minutes.

Step 80—Obtain Credit Report. Here the credit report is obtained from the credit reporting bureau via the internet. This process is disclosed in U.S. patent application Ser. No. 10/665,244 entitled Method of On-Line Credit Information Monitoring and Control by S. Kasower, filed Sep. 20, 2003 and is herein incorporated by reference. This invention allows the credit card management to obtain a copy of the individual user's credit history, which will list all the credit cards.

Step 82—Enter Credit Report into Database. The raw credit report data is parsed into the database.

Step 84—Select potential credit cards from raw data. This step involves the culling of credit card type trade lines from the raw data and marking them as potential credit cards to be automatically registered.

Step 86—Determine Issuers Of Credit Cards. Individual credit reporting bureaus have their own short hand notation for the issuer of the cards. For example, a Capital One credit card may be listed by one credit bureau as "Capone", while another bureau may use "Capital 1." Considering the large number of credit card issuers, the number of possible "aliases" is numerous. However, there are only a few widely used bureaus, so comparing aliases is not too difficult.

Step 88—Identify type of credit card. It is somewhat of the same problem as in Step 86, but again manageable.

Step 90—Mark Potential Credit Cards. The potential credit cards are sorted into 3 categories: (a) fully identified and automatically registered issuer and credit card; (b) partially automatically registered, only issuer known; and (c) automatically registered, but no match to either a credit card issuer or credit card.

Step 92—Notify Individual Credit Card User. The individual user is notified by e-mail that the results are available. The screen for notification is illustrated in FIG. 42. This screen directs the user to go to Register/Edit Cards screen (FIG. 15).

Step 94—Individual User Approval. The individual user pulls up the Register/Edit Cards screen and presses the edit button and thereafter edits the list of newly automatically registered cards, as well as cards that were not tied to existing card issuers for editing and approval by the individual user.

Step 96—New credit card list prepared. Show user newly, automatically registered cards as well as cards that were unable to be matched to existing card issuers for editing and "approval" by the card user.

Thus it can be seen that the automatic registration of credit cards can be easily accomplished with minimum effort on the part of the individual card user. This is particularly important to individuals that have a large number of credit cards.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the Internet business industry as well as the credit card industry.

The invention claimed is:

1. A system comprising:
    a card management organization computer configured to:
        receive a selection from a user to automatically register with a card management organization;
        receive authorization from the user to request a credit report from a credit reporting bureau;
        request and receive the credit report of the user from the credit reporting bureau, the credit report having account information of one or more financial accounts associated with the user;
        determine respective trade line types of the one or more financial accounts;
        identify one or more credit card accounts from the one or more financial accounts based at least in part on the determined trade line types of respective financial accounts, wherein the credit card accounts are those accounts having credit cards associated with the accounts;

extract card information for the identified one or more credit card accounts from the credit report of the user;

identify respective card issuers for the identified one or more credit card accounts;

automatically register the extracted card information for the identified one or more credit card accounts with the card management organization;

provide a user interface comprising:
  a list of credit card accounts registered with the card management organization wherein the list of credit card accounts includes the identified one or more credit card accounts for which the extracted card information was automatically registered; and
  a list of one or more card management services available with reference to the listed credit card accounts wherein the list of one or more card management services includes at least one of: reporting a lost or stolen card, requesting registration of a new card, requesting a change of address, requesting a new card, notification of a billing dispute, reporting a change in marital status, reporting a change in name, and requesting an increase in credit line;

receive a selection of at least one of the listed card management services with respect to at least one of the credit card accounts; and perform the selected card management services at the identified respective card issuers for the at least one credit card accounts associated with the received selection based at least in part on the registered, extracted card information; and a database coupled to the card management organization computer configured to store the automatically registered extracted card information.

2. The system of claim 1, wherein the card management organization computer is further configured to update the user interface to display at least some of the card information that was registered with the card management organization.

3. The system of claim 1, wherein the database stores known aliases of a plurality of credit card issuers, and
the card management organization computer is further configured to identify respective credit card issuers for the identified one or more credit card accounts by accessing the database.

4. A method performed by a card management organization computer comprising:
receiving, by the card management organization computer, a selection from a user to automatically register with a card management organization;
receiving authorization from the user to request a credit report from a credit reporting bureau;
requesting and receiving, by the card management organization computer, the credit report of the user from the credit reporting bureau, the credit report having account information of one or more financial accounts associated with the user;
determining, by the card management organization computer, respective trade line types of the one or more financial accounts;
identifying, by the card management organization computer, one or more credit card accounts from the one or more financial accounts based at least in part on the determined trade line types of respective financial accounts, wherein the credit card accounts are those accounts having credit cards associated with the accounts;
extracting, by the card management organization computer, card information for the identified one or more credit card accounts from the credit report of the user;
identifying, by the card management organization computer, respective card issuers for the identified one or more credit card accounts;
automatically registering, by the card management organization computer, the extracted card information for the identified one or more credit card accounts with the card management organization;
providing, by the card management organization computer, a user interface comprising:
  a list of credit card accounts registered with the card management organization wherein the list of credit card accounts includes the identified one or more credit card accounts for which the extracted card information was automatically registered; and
  a list of one or more card management services available with reference to the listed credit card accounts wherein the list of one or more card management services includes at least one of: reporting a lost or stolen card, requesting registration of a new card, requesting a change of address, requesting a new card, notification of a billing dispute, reporting a change in marital status, reporting a change in name, and requesting an increase in credit line;
receiving, by the card management organization computer, a selection of at least one of the listed card management services with respect to at least one of the credit card accounts; and
performing the selected card management services at the identified respective card issuers for the at least one credit card accounts associated with the received selection based at least in part on the registered, extracted card information.

5. The method of claim 4, further comprising:
updating, by the card organization management computer, the user interface to display at least some of the card information that was registered with the card management organization.

6. The method of claim 4, further comprising:
accessing known aliases of a plurality of credit card issuers; and
identifying, by the card management organization computer, respective credit card issuers for the identified one or more credit card accounts based on the accessed known aliases.

7. A non-transitory computer readable medium containing program instructions for causing a card management organization computer to:
receive a selection from a user to automatically register with a card management organization;
receive authorization from the user to request a credit report from a credit reporting bureau;
request and receiving the credit report of the user from the credit reporting bureau, the credit report having account information of one or more financial accounts associated with the user;
determine respective trade line types of the one or more financial accounts;
identify one or more credit card accounts from the one or more financial accounts based at least in part on the determined trade line types of respective financial accounts, wherein the credit card accounts are those accounts having credit cards associated with the accounts;

extract card information for the identified one or more credit card accounts from the credit report of the user;

identify respective card issuers for the identified one or more credit card accounts;

automatically register the extracted card information for the identified one or more credit card accounts with the card management organization;

provide a user interface comprising:
- a list of credit card accounts registered with the card management organization wherein the list of credit card accounts includes the identified one or more credit card accounts for which the extracted card information was automatically registered; and
- a list of one or more card management services available with reference to the listed credit card accounts wherein the list of one or more card management services includes at least one of: reporting a lost or stolen card, requesting registration of a new card, requesting a change of address, requesting a new card, notification of a billing dispute, reporting a change in marital status, reporting a change in name, and requesting an increase in credit line;

receive a selection of at least one of the listed card management services with respect to at least one of the credit card accounts; and perform the selected card management services at the identified respective card issuers for the at least one credit card accounts associated with the received selection based at least in part on the registered, extracted card information.

8. The non-transitory computer readable medium of claim 7, wherein the program instructions further cause the card management organization computer to:
update the user interface to display at least some of the card information that was registered with the card management organization.

9. The non-transitory computer readable medium of claim 7, wherein the program instructions further cause the card management organization computer to:
access known aliases of a plurality of credit card issuers; and
identify respective credit card issuers for the identified one or more credit card accounts based on the accessed known aliases.

* * * * *